US009420411B2

United States Patent
Edge, Jr. et al.

(10) Patent No.: US 9,420,411 B2
(45) Date of Patent: Aug. 16, 2016

(54) METHOD AND APPARATUS FOR CONFIGURING SECURE USER PLANE LOCATION (SUPL) ENABLED TERMINALS

(71) Applicant: QUALCOMM Incorporated, San Diego, CA (US)

(72) Inventors: Stephen William Edge, Jr., Escondido, CA (US); Andreas Klaus Wachter, Menlo Park, CA (US)

(73) Assignee: QUALCOMM Incorporated, San Diego, CA (US)

( * ) Notice: Subject to any disclaimer, the term of this patent is extended or adjusted under 35 U.S.C. 154(b) by 9 days.

(21) Appl. No.: 14/042,593

(22) Filed: Sep. 30, 2013

(65) Prior Publication Data

US 2014/0200032 A1 Jul. 17, 2014

Related U.S. Application Data

(60) Provisional application No. 61/752,264, filed on Jan. 14, 2013, provisional application No. 61/755,387, filed on Jan. 22, 2013.

(51) Int. Cl.
   *H04W 4/02* (2009.01)
   *H04W 4/00* (2009.01)

(52) U.S. Cl.
   CPC ............... *H04W 4/02* (2013.01); *H04W 4/001* (2013.01)

(58) Field of Classification Search
   CPC ........... H04W 4/02; H04W 24/00; H04Q 7/20
   See application file for complete search history.

(56) References Cited

U.S. PATENT DOCUMENTS

| | | | |
|---|---|---|---|
| 8,086,247 B2 | 12/2011 | Kraufvelin et al. | |
| 8,738,027 B2 | 5/2014 | Edge et al. | |
| 2007/0032249 A1 | 2/2007 | Krishnamurthi et al. | |
| 2007/0167177 A1* | 7/2007 | Kraufvelin | H04W 8/22 455/466 |
| 2011/0249623 A1 | 10/2011 | Wachter et al. | |
| 2011/0258328 A1 | 10/2011 | Ghozati et al. | |

(Continued)

FOREIGN PATENT DOCUMENTS

| | | |
|---|---|---|
| TW | 201240508 A | 10/2012 |
| WO | WO-2012109153 | 8/2012 |
| WO | WO-2012109155 A1 | 8/2012 |

OTHER PUBLICATIONS

"SLP Discovery Models and Mechanisms" TeleCommunication Systems (TCS), Dec. 15, 2010.*
International Search Report and Written Opinion—PCT/US2013/074165—ISA/EPO—May 14, 2014.

(Continued)

*Primary Examiner* — Myron K Wyche
(74) *Attorney, Agent, or Firm* — Kilpatrick Townsend & Stockton LLP

(57) ABSTRACT

Methods, systems, computer-readable media, and apparatuses are disclosed for providing location services to an application in a Secure User Plane Location (SUPL) Enabled Terminal (SET). In some embodiments, a SUPL configuration server (SUPL CS) may configure multiple secure user plane location (SUPL) location platforms (SLPs) in a first stage. Subsequently, the SUPL CS may configure information independently for the application in a second stage, wherein the configuration information for the application includes identification of a particular Home SLP (H-SLP) configured in the first stage.

48 Claims, 11 Drawing Sheets

(56) References Cited

U.S. PATENT DOCUMENTS

| | | | | |
|---|---|---|---|---|
| 2012/0252492 | A1* | 10/2012 | Chien | H04W 4/20 455/456.2 |
| 2013/0012166 | A1 | 1/2013 | Li et al. | |
| 2013/0012232 | A1 | 1/2013 | Titus et al. | |
| 2013/0203447 | A1* | 8/2013 | Hannan | G01S 5/0205 455/456.5 |

OTHER PUBLICATIONS

Open Mobile Alliance: "Secure User Plane Location Architecture, Draft Version 3.0", Jan. 3, 2011, OMA-AD-SUPL-V3_0-20110103-D, pp. 1-40.

Taiwan Search Report—TW102147645—TIPO—Aug. 25, 2015.

* cited by examiner

| Application | H-SLP |
|---|---|
| 305 ⟍ Application 1 | 310 ⟍ H-SLP 1 |
| 306 ⟍ Application 2 | 310 ⟍ H-SLP 1 |
| 307 ⟍ Application K | 311 ⟍ H-SLP I |
| Application K+1 | H-SLP N |
| 320 ⟍ Application N | 325 ⟍ H-SLP Def |

FIG. 3B

| D-SLP | H-SLP |
|---|---|
| 315 ⟍ D/E-SLP 11 | 310 ⟍ H-SLP 1 |
| 316 ⟍ D/E-SLP 1M | 310 ⟍ H-SLP 1 |
| D/E-SLP I1 | H-SLP I |
| D/E-SLP IM | H-SLP I |
| D/E-SLP N1 | H-SLP N |
| D/E-SLP NM | H-SLP N |
| D/E-SLP Def1 | 325 ⟍ H-SLP Def |
| D/E-SLP DefP | 325 ⟍ H-SLP Def |

FIG. 3C

METHOD AND APPARATUS FOR CONFIGURING SECURE USER PLANE LOCATION (SUPL) ENABLED TERMINALS

CROSS-REFERENCE TO RELATED APPLICATIONS

This application claims the benefits of U.S. Provisional App. No. 61/752,264, filed Jan. 14, 2013, and U.S. Provisional App. No. 61/755,387, filed Jan. 22, 2013, the disclosures of which are hereby incorporated by reference in their entirety and for all purposes.

BACKGROUND

Aspects of the disclosure relate to location-based services for mobile wireless devices. In particular, various aspects of the disclosure relate to Secure User Plane Location (SUPL) technology.

Location services for mobile wireless devices enable the current location and, in some cases, speed and heading of a mobile wireless device to be obtained and provided to the wireless device (e.g., to an application running on the wireless device or to the user of the wireless device) or to some third party application. Examples of a third party application may include an emergency services provider (e.g., in the case of an emergency call from the wireless device) or some external provider of commercial services that depend on knowing the wireless device's current or previous location. For wireless devices that may access different types of wireless communication networks, location services may typically be supported using a location server that can be accessed from, and in some cases may be resident within, the wireless network currently being accessed by the wireless device.

The role of the location server may be to assist the wireless device to make appropriate location related measurements (e.g., measurements of radio signals from base stations in the serving wireless network or measurements of various global navigation satellites). Additionally, in some cases, the location server may compute the wireless device's location based on these measurements. The location server may also be used to relay a wireless device's location to entities authorized to receive the location and to convey the wireless device's location to the wireless device in the event that the location server rather than wireless device had computed the location.

Current user plane location services, such as the Secure User Plane Location (SUPL) service defined by Open Mobile Alliance (OMA), can include a target mobile device (e.g., SUPL Enabled Terminal (SET)) and a location server (e.g., a SUPL Location Platform (SLP)).

A home location server (e.g., a Home SLP (H-SLP) in the case of SUPL) is a location server permanently affiliated with a number of target mobile devices (e.g., based on service subscription). A home location server would sometimes belong to a home network operator of the target device, in the case of mobile wireless devices.

A location server without a pre-provisioned permanent affiliation with a set of target devices may be referred to as a discovered location server. In the case of SUPL, a discovered location server is referred to as a Discovered SLP (D-SLP). A discovered location server can be found by, or provided to, a target mobile device based on its current location, currently used access network(s) and/or the current date and time and could belong to or be associated with, a non-home network operator or some other non-operator provider of location services. A D-SLP is an SLP able to provide service to a SET in areas where the H-SLP is unable to provide service or unable to provide service at the requested quality of service (e.g., accuracy, time to fix). Additionally, an Emergency SLP (E-SLP) may support location services for an emergency call made by the SET user.

There may be a benefit (e.g. in terms of reduced delay and/or better quality of location service) to making a mobile terminal (e.g. a SET) aware ahead of time of one or more home location servers (e.g. H-SLPs) and/or discovered location servers (e.g. D-SLPs) that the mobile terminal may use to obtain location services at different locations and when using different access networks.

BRIEF SUMMARY

Various techniques are described herein for provisioning or configuring the identities of SLPs (e.g., H-SLP, D-SLP, E-SLP) in a SET, where the SET can then request location services.

In certain locations or environments, an H-SLP may not be able to adequately aid the SET in positioning (e.g., provide appropriate assistance data, perform positioning calculation). In these instances, a D-SLP and/or E-SLP may have a better ability than the H-SLP to aid the SET in positioning. In such instances, a D-SLP and/or E-SLP may be used to provide improved (e.g., localized) location service to an application on the SET. The operator or provider of an H-SLP may be willing to provide location services to a SET or to certain applications on a SET and may further negotiate with the operator or provider of a D-SLP and/or E-SLP to allow the SET, or the applications on the SET that can access the H-SLP, to have access to the D-SLP and/or E-SLP. Therefore, when a specific application on the SET requests location services, the SET may determine a particular H-SLP, or a particular D-SLP or E-SLP associated with this H-SLP, from which location services can be obtained.

According to some embodiments, a SUPL configuration server (SUPL CS) can be owned by an operator who also owns an H-SLP for a number of SETs. In a conventional SUPL system, the H-SLP address is configured in the SET, which can be done in several different ways.

A SUPL CS can pre-configure information about SLPs that can or should be used by a SET in different situations. The SUPL CS may configure H-SLPs and/or D-SLPs and/or E-SLPs. Additionally, different applications or different sets of applications may be configured to use different H-SLPs. In some instances, a set of applications may be associated with the home operator. For example, when an application requests location services from a SET, the application may be directed to the H-SLP of the home operator of the SET. Alternatively, some applications may be configured to use other H-SLPs. For example, a map application that provides location services (e.g. such as direction finding or navigation) to a user based on provision of a map may be associated with (e.g. may be provided by) a global map application vendor. Therefore, when the map application requests location services, the SET may direct any location request for the map application to the H-SLP associated with the global map application vendor. Additionally, in one or more arrangements, the SET may be able to enable multiple H-SLPs for an application.

In some embodiments, an application can be associated with a single H-SLP, which may result in the application being restricted to obtaining location services from this H-SLP only and/or from D-SLPs and/or E-SLPs configured for or authorized by this H-SLP. Additionally, in some cases, the application may not be enabled to obtain location services from any other H-SLP. Therefore, a SUPL CS may configure a number of D-SLPs for the assigned H-SLP which may then be used instead of the H-SLP to obtain location services for the application. In this way, if the application needs location services when the SET is roaming in an area for which the H-SLP for the application has little or no location related data (such as in another country), the application can send a request to a positioning service within the SET, and the positioning service, by making use of the pre-configured information, can know both the associated H-SLP for this application and a number of D-SLPs. Then, the SET may determine from this information whether a location request for the application should be sent to the H-SLP for the application or to one of the D-SLPs and/or E-SLPs associated with this H-SLP.

According to some embodiments, a method for providing location services to an application at a Secure User Plane Location (SUPL) Enabled Terminal (SET) is presented. The method may include: configuring, by a SUPL configuration server (SUPL CS), multiple SUPL location platforms (SLPs) in the SET in a first stage; and configuring, by the SUPL CS, information independently in the SET for the application in a second stage, wherein the configuration information for the application includes identification of a particular Home SLP (H-SLP) configured in the first stage.

In some embodiments, the configuration in the first stage may include storing, in the SET, SLP information corresponding to the multiple SLPs, and the configuration in the second stage may include storing, in the SET, H-SLP information corresponding to the particular H-SLP. Additionally, the SLP information can include addresses associated with the multiple SLPs, and the H-SLP information can include an address associated with the particular H-SLP.

In some embodiments, the SUPL CS configures at least one H-SLP as part of the first stage.

In some embodiments, the SUPL CS configures at least one Discovered SLPs (D-SLPs) for at least one configured H-SLP as part of the first stage.

In some embodiments, the SUPL CS configures at least one Emergency SLPs (E-SLPs) for at least one configured H-SLP as part of the first stage.

In some embodiments, the application is permitted location access to only one configured H-SLP and any D-SLPs and E-SLPs authorized by or configured for the only one configured H-SLP.

In some embodiments, the application is not configured with an H-SLP as part of the second stage, and is permitted location access to a default H-SLP configured in the first stage and any D-SLPs and E-SLPs authorized by or configured for the configured default H-SLP.

In some instances, the SUPL CS supports authorization of an application as part of the second stage. In some embodiments, information provided to a SUPL Enabled Terminal (SET) as part of authorization can include a SUPL 2.0 application ID and an address of an H-SLP. In some embodiments, the information provided to the SET can further include a time duration after which re-authorization of the application is required. In some embodiments, the application is authorized by the SUPL CS as part of the authorization.

According to some embodiments, a secure user plane location configuration server (SUPL CS) for providing location services to an application at a Secure User Plane Location (SUPL) Enabled Terminal (SET) is presented. The SUPL CS may include: one or more processors, and memory storing computer-readable instructions that, when executed by the one or more processors, cause the SUPL CS to: configure multiple SUPL location platforms (SLPs) in the SET in a first stage; and configure information independently in the SET for the application in a second stage, wherein the configuration information for the application includes identification of a particular Home SLP (H-SLP) configured in the first stage.

According to some embodiments, one or more computer-readable media are presented. The one or more computer-readable media may store computer-executable instructions for providing location services to an application at a Secure User Plan Location (SUPL) Enabled Terminal (SET) that, when executed, may cause one or more computing devices included in a SUPL configuration server (SUPL CS) to: configure multiple SUPL location platforms (SLPs) in the SET in a first stage, and configure information independently for the application in the SET in a second stage, wherein the configuration information for the application includes identification of a particular Home SLP (H-SLP) configured in the first stage.

According to some embodiments, an apparatus for providing location services to an application at a Secure User Plan Location (SUPL) Enabled Terminal (SET) is presented. The apparatus may include: a means for configuring multiple SUPL location platforms (SLPs) in the SET in a first stage, and means for configuring information in the SET independently for the application in a second stage, wherein the configuration information for the application includes identification of a particular Home SLP (H-SLP) configured in the first stage.

According to some embodiments, a technique for an application to obtain location services from a SET is disclosed. The technique can include: receiving, by the SET, a location services request from the application, determining whether the application is associated with an H-SLP, and obtaining, by the SET, location services based on the location service request using the H-SLP or one or more SLPs associated with the H-SLP, if it is determined that the application is associated with an H-SLP.

In some embodiments, the technique for an application to obtain location services from a SET can further include obtaining, by the SET, location services based on the location service request using a default H-SLP, if it is determined that the application is not associated with the H-SLP and the application is allowed to use the default H-SLP.

In some embodiments, the technique for an application to obtain location services from a SET can further include rejecting the location services request, by the SET, if it is determined that the application is not associated with the H-SLP and the application is not allowed to use a default H-SLP.

In some embodiments, the technique for an application to obtain location services from a SET can further include storing, by the SET, an address of the H-SLP associated with the application, wherein the determination of whether the application associated with an H-SLP is based on the stored address of the H-SLP.

In some embodiments, the technique for an application to obtain location services from a SET can further include determining, by the SET, whether the location services request is a first request from the application. If it is determined that the location services request is the first request from the application, the technique can further include: transmitting, by the SET, a service request to a SUPL CS, where the service request includes information associated with the application; receiving, by the SET, an address of an H-SLP from the SUPL CS, if it is determined by the SUPL CS that the application is associated with an H-SLP; and storing, by the SET, the received address of the H-SLP associated with the application. Additionally, the technique can include receiving, by the SET, a time duration associated with the address of the H-SLP, if the address of the H-SLP is received by the SET.

In some embodiments, the one or more SLPs associated with the H-SLP include one or more D-SLPs and/or one or more E-SLPs authorized by the H-SLP to respond to the location service request from the application.

In some embodiments, the one or more SLPs associated with the H-SLP include one or more D-SLPs and/or one or more E-SLPs configured by a SUPL CS to respond to the location service request from the application.

BRIEF DESCRIPTION OF THE DRAWINGS

A further understanding of the nature and advantages of various embodiments may be realized by reference to the following figures. In the appended figures, similar components or features may have the same reference label. Further, various components of the same type may be distinguished by following the reference label by a dash and a second label that distinguish among the similar components. If only the first reference label is used in the specification, the description is applicable to any one of the similar components having the same first reference label irrespective of the second reference label.

FIG. 3B illustrates an example mapping table for the applications in association with a corresponding H-SLP from the example system diagram in FIG. 3A, according to some embodiments.

FIG. 3C illustrates an example mapping table for a D/E-SLP in association with a corresponding H-SLP from the example system diagram in FIG. 3A, according to some embodiments.

DETAILED DESCRIPTION

Figure 1A:
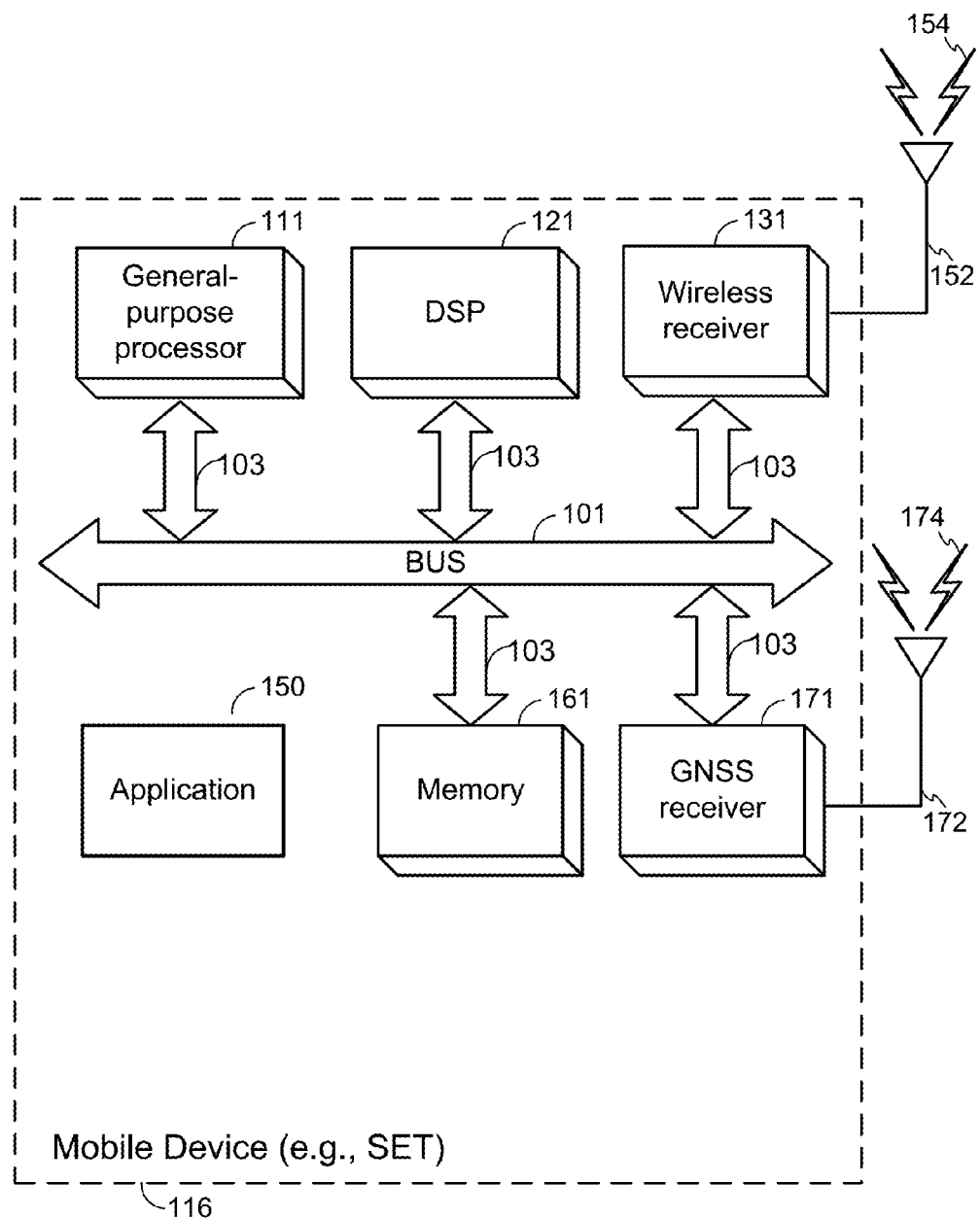
FIG. 1A is a block diagram illustrating an exemplary mobile device according to some embodiments.

The word "exemplary" is used herein to mean "serving as an example, instance, or illustration." Any embodiment or design described herein as "exemplary" is not necessarily to be construed as preferred or advantageous over other embodiments or designs.

The techniques described herein may be used for various wireless communication networks such as Code Division Multiple Access (CDMA) networks, Time Division Multiple Access (TDMA) networks, Frequency Division Multiple Access (FDMA) networks, Orthogonal FDMA (OFDMA) networks, Single-Carrier FDMA (SC-FDMA) networks, etc. The terms "networks" and "systems" are often used interchangeably. A CDMA network may implement a radio technology such as Universal Terrestrial Radio Access (UTRA), CDMA2000, etc. UTRA includes Wideband-CDMA (W-CDMA) and Low Chip Rate (LCR). CDMA2000 covers IS-2000, IS-95, IS-856 and High Rate Packet Data (HRPD) standards. A TDMA network may implement a radio technology such as Global System for Mobile Communications (GSM). An OFDMA network may implement a radio technology such as Evolved UTRA (E-UTRA), IEEE 802.11, IEEE 802.16, IEEE 802.20, Flash-OFDM®, etc. UTRA is part of Universal Mobile Telecommunication System (UMTS). Long Term Evolution (LTE) is a radio technology that uses E-UTRA. UTRA, E-UTRA, GSM, UMTS, W-CDMA and LTE are described in documents from an organization named "3rd Generation Partnership Project" (3GPP). CDMA2000 is described in documents from an organization named "3rd Generation Partnership Project 2" (3GPP2). These various radio technologies and standards are known in the art.

Various embodiments are described herein in connection with a mobile device, an access terminal or a Secure User Plan Location (SUPL) Enabled Terminal (SET). A SET can be any SUPL Enabled Terminal (e.g., mobile device, access terminal, game console, PDA, tablet, laptop computer). A SET can also be called a system, subscriber unit, subscriber station, mobile station, mobile, remote station, remote terminal, mobile device, user terminal, terminal, mobile terminal, wireless device, wireless terminal, wireless communication device, user agent, user device, or user equipment (UE). A mobile device, access terminal or SET can be, for example, a cellular telephone, a cordless telephone, a Session Initiation Protocol (SIP) phone, a wireless local loop (WLL) station, a personal digital assistant (PDA), a handheld device having wireless connection capability, a computing device, a laptop, a tablet, a smartphone or other processing device connected to or containing a modem, for example a wireless modem. Moreover, various embodiments are described herein in connection with a base station. A base station can be utilized for communicating with access terminal(s) and can also be referred to as an access point, Node B, Evolved Node B (eNodeB), access point base station, a WiFi access point, a Femtocell, home base station, home Node B, home eNodeB or some other terminology.

Various embodiments are described herein for provisioning or configuring the identities of SLPs in the SET, where the SET can then request location services.

In a user plane environment, all signaling is conveyed as data traffic from the perspective of a network—e.g. using IP or TCP/IP for data transport. The main components can include a location server, which may be referred to as an SLP, and a terminal, which may be referred to as a SET. An example of a SUPL session between a SET and an SLP can include the SLP providing assistance data to help the SET make location measurements, and in some cases help the SET compute a location. Additionally, the SLP can also send a request for location measurements to the SET, which the SET can obtain and then send back, and the location related capabilities of either end may also be exchanged. The User plane Location Protocol (ULP) defined by OMA is the protocol that is used between the SET and the SLP to support SUPL.

In one or more arrangements, a home location server (e.g., an H-SLP) is a location server permanently affiliated with a number of SET target devices (e.g., based on service subscription). A location server without a pre-provisioned affiliation with a set of target devices is called a discovered location server (e.g., a D-SLP).

In one or more arrangements, an H-SLP may store data that is descriptive of a D-SLP and/or possibly an E-SLP that may support location services for an emergency call made by a SET user. Here, for example, a SET may acquire a broadcasted signal from an access network providing an identity of a D-SLP that provides location services on behalf of this access network. The SET may then forward the acquired identity of the D-SLP to the H-SLP and receive, for example, an authorization to access and obtain location services from the D-SLP and a set of conditions under which the SET may or should obtain location services from the D-SLP. The conditions may include the description of one or more geographic areas within which the SET may or should obtain location services from the D-SLP and/or the identities of one or more access networks that, if being accessed by the SET, may allow or require location services from the D-SLP.

In certain locations or environments, an H-SLP may not be able to adequately aid the SET in positioning (e.g., provide appropriate assistance data, perform positioning calculation). This may occur when a SET is at location for which the H-SLP has little or no location related data—e.g. little or no information on local base stations or access points whose signals a SET may measure in order to help determine its location and/or little or no information on local terrain including building layouts and land topography that may also contribute to helping determine location. In these instances, a D-SLP and/or E-SLP may have a better ability than the H-SLP to aid the SET in positioning. In such instances, a D-SLP and/or E-SLP may be used to provide improved (e.g., localized) location service to an application on the SET. When a SET determines that it is at a location where a D-SLP or E-SLP may provide better location support than an H-SLP, the SET may query the H-SLP to provide the addresses of one or more D-SLPs and/or E-SLPs that the SET may or should access to obtain location related services (e.g. obtain assistance data and/or help in computing its location). The H-SLP may also provide a set of conditions under which the SET may or should access each provided D-SLP and E-SLP.

In general, a SET may obtain information from an H-SLP regarding D-SLPs and/or E-SLPs that the SET may or should use under certain conditions (e.g. within certain geographic areas or when accessing certain networks) in one of two ways. In one way, the SET may discover a D-SLP or E-SLP (e.g. discover an identity or address for a D-SLP or E-SLP) from currently available information (e.g. information received from a website or broadcast by a nearby base station or access point) and may query an H-SLP for authorization to access the D-SLP or E-SLP and for the conditions under which such access is allowed or required. In the second way, the SET may query an H-SLP to provide the identities or addresses of D-SLPs and/or E-SLPs that the SET may or should access instead of the H-SLP at its current location.

In some cases, it may be more convenient, less complex and/or faster for a SET to access information that has been configured on the SET in advance regarding (i) permitted H-SLPs that a SET may use to obtain location services and (ii) for each H-SLP, a number of D-SLPs and/or E-SLPs that the SET may or should access under certain conditions instead of the H-SLP. Configuration in advance may avoid the need for a SET to (i) discover D-SLPs and/or E-SLPs, (ii) query an H-SLP to authorize one or more discovered D-SLPs and/or E-SLPs, and/or (iii) query an H-SLP to obtain the addresses or identities of authorized D-SLPs and/or E-SLPs. Configuration in advance may also assign to any application on the SET a particular H-SLP and a set of D-SLPs and/or E-SLPs associated with this H-SLP. Configuration of SLP related data on a SET may be performed by a SUPL Configuration Server (CS). The configured H-SLP for an application and any D-SLP and/or E-SLPs associated with this H-SLP may then be used by the SET to support location services on behalf of the application. For example, if the application requests the current location of the SET in order to provide the user of the SET with some location related service such as navigation, direction finding or provision of information (e.g. on traffic, weather, shops) for the current location, the SET may use the H-SLP or one of the D-SLPs (or E-SLPs) configured for the application to help obtain the location (e.g. by providing assistance data for SET location measurements and possibly location computation). For an application on the SET (e.g. an application recently downloaded to the SET by the user of the SET) for which an H-SLP is not yet configured, the SET may query the SUPL CS to return an H-SLP that the SET may use to support location services on behalf of the application.

According to some embodiments, a SUPL CS can be owned by the operator who also owns the H-SLP for a number of SETs. In a conventional SUPL system, the H-SLP address is configured in the SET, which can be done in several different ways.

A SUPL CS can pre-configure information about SLPs that can be used by a SET or should be used by a SET in different situations. The SUPL CS may configure H-SLPs and/or D-SLPs and/or E-SLPs. Additionally, different applications or different sets of applications may be configured to use different H-SLPs. In some instances, a set of applications may be associated with the home operator. For example, when an application requests location services from a SET, the application may be directed to the H-SLP of the home operator of the SET. Alternatively, some applications may be configured to use other H-SLPs. For example, a map application that provides location services to a user based on provision of a map (e.g. such as direction finding or navigation) may be associated with (e.g. may be provided by) a global map application vendor. Therefore, when the map application requests location services, the SET can direct the map application to the H-SLP associated with the global map application vendor. Additionally, in one or more arrangements, the SET may enable multiple H-SLPs for an application.

In some embodiments, an application can be associated with a single H-SLP, which may result in the application being restricted to obtaining location services from this H-SLP only and/or from D-SLPs and/or E-SLPs configured for or authorized by this H-SLP. Additionally, in some cases, the application may not be enabled to obtain location services from any other H-SLP. Therefore, the SUPL CS may configure a number of D-SLPs for the assigned H-SLP which may then be used instead of the H-SLP to obtain location services for the application. Therefore, if the application needs location services when the SET is roaming in an area for which the H-SLP for the application has little or no location related data (such as in another country), the application can send a request to a positioning service within the SET, and the positioning service, by making use of the pre-configured information, can know both the associated H-SLP for this application and a number of D-SLPs. Then, the SET may determine from this information whether a location request for the application should be sent to the H-SLP for the application or to one of the D-SLPs and/or E-SLPs associated with this H-SLP.

FIG. 1A is a block diagram illustrating an exemplary mobile device (e.g., SET 116) according to some embodiments. The mobile device 116 may include a global navigation satellite system (GNSS) receiver 171 capable of receiving GNSS signals 174 via a GNSS antenna 172 coupled to the GNSS receiver 171. The GNSS receiver 171 may also process, in whole or in part, the GNSS radio signals 174 and use the GNSS signals 174 to determine the location of the mobile device (e.g., SET 116). In some embodiments, general-purpose processor(s) 111, memory 161, DSP(s) 121, and specialized processors (not shown) may also be utilized to process the GNSS signals 174, in whole or in part, and/or calculate the location of the mobile device 116, in conjunction with GNSS receiver 171. The storage of GNSS or other location signals may be done in memory 161 or other registers (not shown).

The mobile device 116 may include DSP(s) 121 connected to a bus 101 by a bus interface 103, general-purpose processor(s) 111 connected to the bus 101 by a bus interface 103, and memory 161 connected to the bus 101 by a bus interface 103. The bus interfaces 103 may be integrated with the DSP(s) 121, general-purpose processor(s) 111, and memory 161 with which they are associated. In various embodiments, functions may be stored as one or more instructions or code in memory 161, such as on a computer-readable storage medium, such as RAM, ROM, FLASH, or disc drive, and executed by general-purpose processor(s) 111, specialized processors, or DSP(s) 121. Memory 161 may be a processor-readable memory and/or a computer-readable memory that stores software code (programming code, instructions, etc.) configured to cause the general-purpose processor(s) 111 and/or DSP(s) 121 to perform the functions described. In other embodiments, the functions described may be performed in hardware.

In some embodiments, the mobile device 116 may also include a wireless receiver 131 connected to the bus 101 by a bus interface 103. The wireless receiver 131 may be operable to receive a wireless signal 154 via antenna 152. The wireless signal 154 may be transmitted via a wireless network. In some embodiments, the wireless network may be any wireless network such as, but not limited to, the Internet, a Personal Access Network (PAN), a wireless local area (e.g. WiFi) network, or a cellular network (e.g. a GSM, WCDMA, LTE, CDMA2000 network). In some embodiments, antennas 152 and 172 may be the same antenna.

The mobile device 116 may include an application 150 running on the mobile device 116. Application 150 can include a software application, website, and other functionalities that can be provided on or to the mobile device 116 to further enhance a user's experience when using such a device. Application 150 may include software stored in memory 161 and may run on general purpose processor(s) 111 and/or on DSP(s) 121. In some embodiments, mobile device 116 may include more than one application 150. According to some embodiments, different applications may be configured to use different H-SLPs, D-SLPs and/or E-SLPs for location-based services. For example, when an application requests location services from the mobile device, the application may be directed to the H-SLP of the home operator of the mobile device. Alternatively, some applications may be configured to use other H-SLPs. For example, a map application that provides location services to a user based on provision of a map may be associated with a global map application vendor. Therefore when the map application requests location services, the mobile device may direct any location request for the map application to the H-SLP associated with the global map application vendor. Additionally, in one or more arrangements, the mobile device may be able to enable multiple H-SLPs for an application 150.

The mobile device described in FIG. 1A may be, for example, a cellphone, smartphone. PDA, tablet, laptop, tracking device or some other wireless supportable and moveable device, and may be referred to as a mobile terminal, mobile station (MS), terminal, device, wireless device, user equipment (UE), SET, target device, target or by some other name. The location of mobile device may be referred to as a location estimate, position or position estimate and the operation whereby the location is obtained may be referred to as location, locating, positioning or by some other name.

Figure 1B:
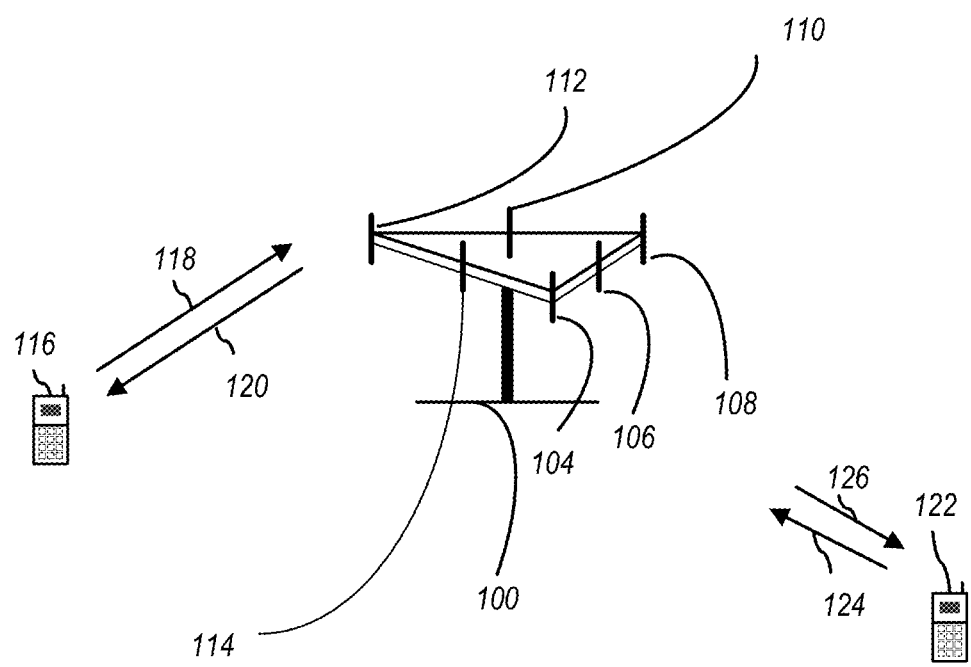
FIG. 1B is a graphical illustration of an example wireless network environment that can be employed in conjunction with the various systems and methods described herein.

Referring now to FIG. 1B, a multiple access wireless communication system according to some embodiments is illustrated. An access point (AP) 100 includes multiple antenna groups; one including 104 and 106, another including 108 and 110, and an additional one including 112 and 114. In FIG. 1B, only two antennas are shown for each antenna group, however, more or fewer antennas may be utilized for each antenna group. An access terminal, such as a SET 116, is in communication with antennas 112 and 114, where antennas 112 and 114 transmit information to access terminal (e.g., SET 116) over forward link 120 and receive information from access terminal (e.g., SET 116) over reverse link 118. Another access terminal (e.g., SET 122) is in communication with antennas 106 and 108, where antennas 106 and 108 transmit information to access terminal (e.g., SET 122) over forward link 126 and receive information from access terminal (e.g., SET 122) over reverse link 124. In a Frequency Division Duplex (FDD) system, communication links 118, 120, 124 and 126 may use a different frequency for communication. For example, forward link 120 may use a different frequency from that used by reverse link 118. More detailed descriptions of SETs 116 and 122 may be consistent with the disclosures in FIG. 1A, and SETs 116 and 122 may be configured to perform the methods described below.

The system in FIG. 1B may support operation on multiple carriers (waveform signals of different frequencies). Multi-carrier transmitters can transmit modulated signals simultaneously on the multiple carriers. Each modulated signal may be a Code Division Multiple Access (CDMA) signal, a Time Division Multiple Access (TDMA) signal, an Orthogonal Frequency Division Multiple Access (OFDMA) signal, a Single-Carrier Frequency Division Multiple Access (SC-FDMA) signal, etc. Each modulated signal may be sent on a different carrier and may carry pilot data, overhead information, data, etc.

Each group of antennas and/or the area in which they are designed to communicate is often referred to as a sector of the access point. In the embodiment, antenna groups each are designed to communicate to access terminals in a sector of the areas covered by access point 100.

In communication over forward links 120 and 126, the transmitting antennas of access point 100 may utilize beamforming in order to improve the signal-to-noise ratio of forward links for the different access terminals. Also, an access point using beamforming to transmit to access terminals scattered randomly through its coverage causes less interference to access terminals in neighboring cells than an access point transmitting through a single antenna to all its access terminals.

Other access points or transmitting stations may be employed. For example, a base station may be used in addition to or instead of the AP 100. In some embodiments, a first transmitter such as the AP 100 may provide access to a first network while a second transmitter, for example a cellular base station, may provide access to a second network. In some embodiments, the areas in which each of the first transmitter and second transmitter may be accessed overlap.

Figure 1C:
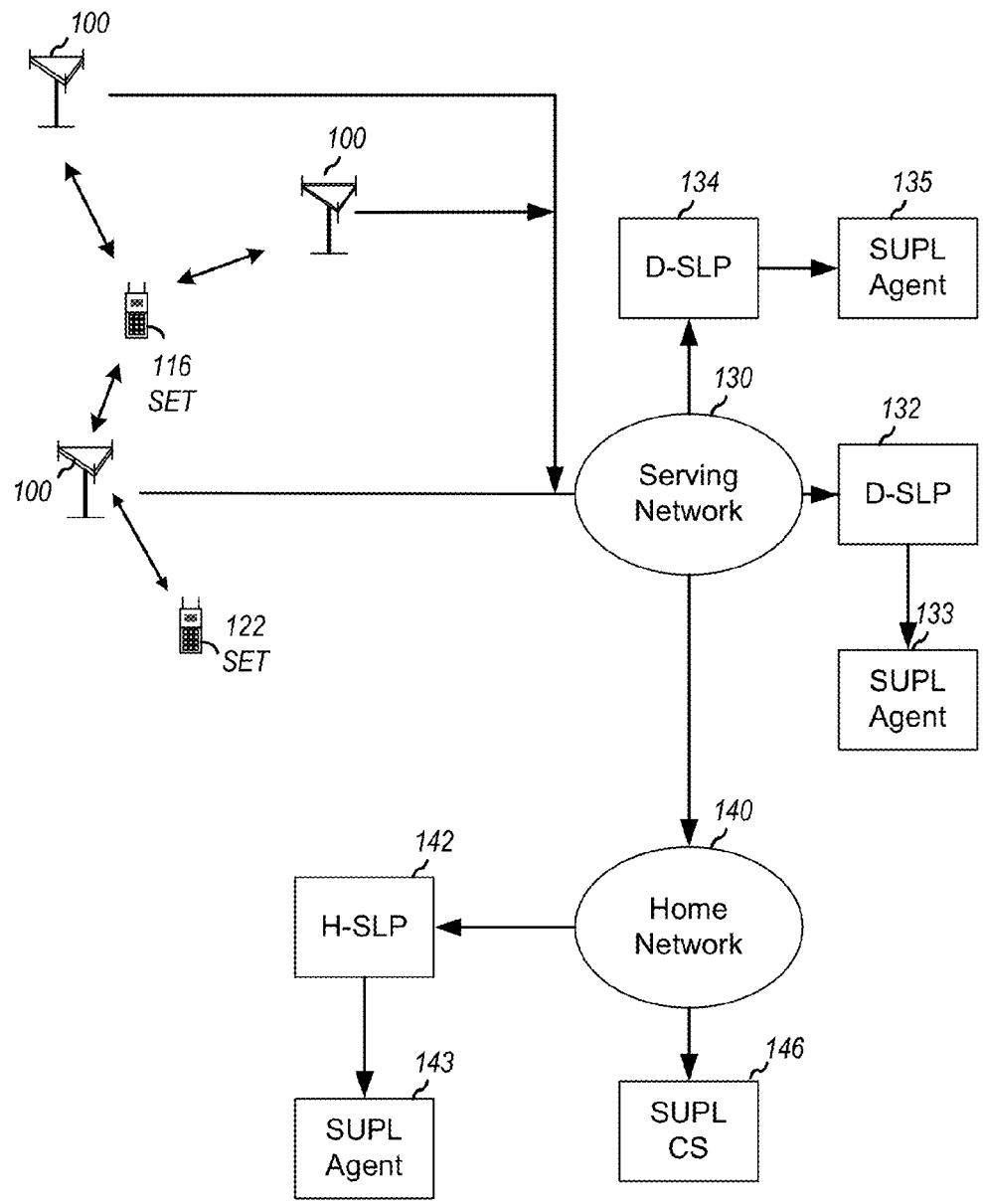
FIG. 1C illustrates one or more SETs accessing one or more base stations and access points.

FIG. 1C illustrates one or more SETs accessing one or more base stations and access points. For example, a SET 116 and SET 122 can access some APs and base stations. The base stations and access points can be connected to a serving network 130 (e.g. a WCDMA, LTE or cdma2000 serving network). Additionally, the serving network 130 can be connected to a home network 140 for SET 116 and SET 122 either directly or via intermediate entities and systems such as the Internet. In some cases, serving network 130 and home network 140 may be the same network. In this example, D-SLP 132 and D-SLP 134 can be connected to, or can be part of, the serving network 130. Additionally, an H-SLP 142 can be connected to, or can be part of, the home network 140.

According to some embodiments, a SUPL Agent 133, 135, and 143, also known as an External Client, can each be connected to SLP 132, 134, and 142, respectively. For example, SUPL Agent 143 can request the location of SET 122 from its associated SLP (i.e., H-SLP 142), and the SLP (i.e., H-SLP 142) can then instigate a SUPL location session with the SET 122 to obtain the location.

In FIG. 1C, H-SLP 142 may be the home SLP for SET 116 and SET 122. SETs 116 and 122 may then obtain location services from H-SLP 142 in some situations—e.g., when SETs 116 and 122 are each directly accessing home network 140. Such location services may be supported using the SUPL location solution defined in publicly available specifications by OMA and may include the transfer of assistance data from H-SLP 142 to SET 116 or SET 122 to enable either SET to acquire and measure radio signals from access points and/or base stations (such as access point 100) in the current serving network and/or from global navigation satellites (not shown in FIG. 1C). Examples of global navigation satellites may include satellites belonging to the Global Positioning System (GPS) or other systems, such as the European Galileo system or Russian GLONASS system. Additional SUPL location services performed by H-SLP 142 may include computation of a location estimate for SET 116 or 122 based on signal measurements made and provided to H-SLP 142 by SET 116 or 122.

Further, SUPL location services may include transfer of a location estimate obtained by H-SLP 142 to SUPL Agent 143 or to SET 116 or SET 122. In the case that SET 116 and SET 122 are accessing serving network 130, which is different than home network 140, better location services may be provided using SUPL by D-SLP 132 and D-SLP 134 than by H-SLP 142. This may arise because D-SLPs 132 and 134 have better knowledge of serving network 130 than does H-SLP 142 (e.g., better knowledge of the locations and transmission characteristics of access points 100), and thus may be better able to (i) provide location assistance data related to acquiring and measuring radio signals from base stations and access points in serving network 130, (ii) compute an accurate location using such measurements, and/or (iii) provide assistance data to SETs 116 and 122 enabling these SETs to compute such a location by themselves. For this reason, it may be advantageous for H-SLP 142 to provide SETs 116 and 122 with information needed to access D-SLPs 132 and 134 in a secure manner. Such information may include the addresses (e.g., IP addresses or fully qualified domain names (FQDNs)) for D-SLPs 132 and 134 and an authorization to access these D-SLPs under certain conditions (e.g., at certain locations, at certain times and/or while accessing certain networks such as serving network 130).

According to some embodiments, an SUPL configuration server (SUPL CS) 146 can be owned by the operator who also owns the H-SLP 142 for a number of SETs (e.g., SET 116, SET 122). In a conventional SUPL system, the H-SLP address may be configured in the SET, which can be done in several different ways. In one example, the SET then interacts with that one H-SLP to obtain location services using SUPL, and the SET can obtain either the addresses of other SLPs (e.g., D-SLPs and E-SLPs) or authorization to access other already known SLPs (e.g., D-SLPs and E-SLPs that may have been discovered locally by the SET) from the H-SLP. This may be needed when the SET is roaming outside of the H-SLP's normal coverage area.

For example, if a user for SET 122 who is normally resident in the US, travels to Europe and has an H-SLP 142 provided by a home carrier in the US, it may turn out that when the user is in Europe, better location services can be provided to SET 122 from some other carrier's SLP—for example from D-SLP 134. The role of the H-SLP 142, in this example, may be to provide the D-SLP address to the SET 122 and to authorize the SET 122 to use it. The H-SLP 142 can tell the SET 122 that it is safe to use a particular D-SLP 134, and the use of any location information for SET 122 will be kept confidential by D-SLP 134.

Additionally, SUPL CS 146 can pre-configure information about SLPs that can be used by a SET (e.g. SET 116 or 122) or should be used by a SET in different situations. The SUPL CS 146 may configure H-SLPs and/or D-SLPs and/or E-SLPs. Additionally, different applications or different sets of applications may be configured to use different H-SLPs—e.g. H-SLP 142 and/or other H-SLPs not shown in FIG. 1C. In some instances, a set of applications may be associated with the home operator. For example, when an application requests location services from SET 122, the application may be directed to H-SLP 142 for the home network 140 of the SET 122. Alternatively, some applications may be configured to use other H-SLPs (not shown in FIG. 1C). For example, a map application that provides location services (e.g. such as direction finding or navigation) to the user of SET 122 based on provision of a map may be associated with (e.g. may be provided by) a global map application vendor. Therefore, when the map application requests location services, the SET can direct any location request for the map application to the H-SLP associated with the global map application vendor.

In some embodiments, an application 150 in a SET 122 can be associated with a single H-SLP, such as H-SLP 142, which may result in the application 150 being restricted to obtaining location services from only H-SLP 142 or from D-SLPs (e.g., D-SLP 132, D-SLP 134) and/or E-SLPs configured for, or authorized by, H-SLP 142. Additionally, in some cases, application 150 may not obtain location services from any other H-SLP. Therefore, SUPL CS 146 may configure a number of D-SLPs (e.g., D-SLP 132, D-SLP 134) in association with the assigned H-SLP 142. Therefore, if application 150 needs location services when SET 122 is roaming in some other country, application 150 can send a request to a positioning service within the SET 122, and the positioning service, by making use of the pre-configured information, can know both the associated H-SLP 142 for this application and a number of D-SLPs (e.g., D-SLP 132, D-SLP 134) that have been configured as being associated with H-SLP 142. Then, SET 122 may determine from this information whether it would go to H-SLP 142 to request location services or to a D-SLP (e.g., D-SLP 132, D-SLP 134). This determination may be based on additional data configured by SUPL CS 146 for each D-SLP (e.g. D-SLP 132, D-SLP 134) associated with H-SLP 142 such as (i) one or more geographic areas within which SET 122 may or should access the D-SLP rather than H-SLP 142 to obtain location services, and/or (ii) one or more networks such as serving network 130 that if currently being accessed by SET 122, may require location service access to the D-SLP rather than to H-SLP 142.

Additionally, in some embodiments, SUPL CS 146 may configure the same or similar information for D-SLPs in SET 122 to information that may be provided to SET 122 by H-SLP 142 (e.g. using SUPL) when authorizing (and possibly providing the addresses of) these D-SLPs (e.g., D-SLP 132, D-SLP 134). As a result, SET 122 may know about D-SLPs using an authorization method from H-SLP 142 or using a configuration method from SUPL CS 146. For example, the H-SLP authorization method may be defined in SUPL version 2.1 and SUPL version 3.0. Additionally, a configuration method using SUPL CS 146 is further defined herein. When both methods are used, precedence may be given to one method or the other in case of conflicting information (e.g. in case of a different set of D-SLPs being authorized by an H-SLP 142 than being configured for H-SLP 142). As an example of precedence, the authorization method may have precedence over the configuration method.

Figure 2:
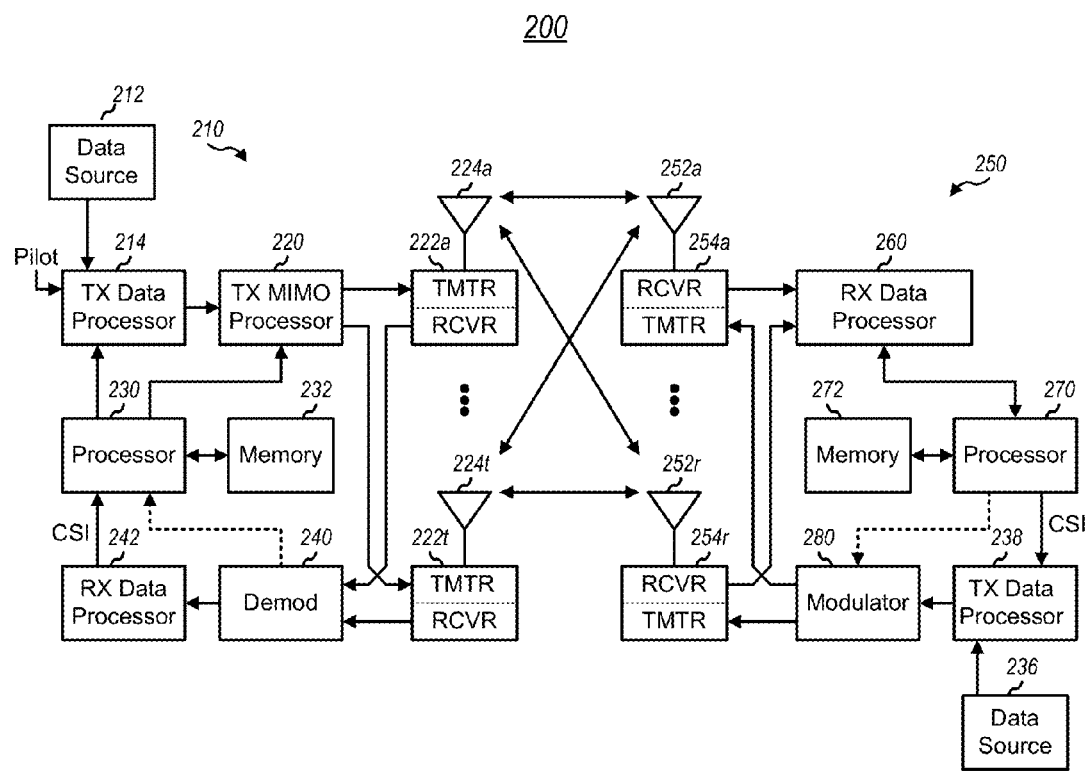
FIG. 2 is an exemplary apparatus of various embodiments.

FIG. 2 is a block diagram of an embodiment of a transmitter system 210 (e.g., access point 100) and a receiver system 250 (e.g., SET 116, SET 122) in a Multiple Input Multiple Output (MIMO) system 200. At the transmitter system 210, traffic data for a number of data streams is provided from a data source 212 to a transmit (TX) data processor 214. It should be noted, however, that while an example MIMO system 200 is described, MIMO is not used in some embodiments, as other systems may be used (e.g., SISO, MISO, SIMO, etc.). At the transmitter system 210, traffic data for a number of data streams is provided from a data source 212 to a transmit (TX) data processor 214.

In some embodiments, each data stream is transmitted over a respective transmit antenna. TX data processor 214 formats, codes, and interleaves the traffic data for each data stream based on a particular coding scheme selected for that data stream to provide coded data.

The coded data for each data stream may be multiplexed with pilot data using OFDM techniques. The pilot data is typically a known data pattern that is processed in a known manner and may be used at the receiver system to estimate the channel response. The multiplexed pilot and coded data for each data stream are then modulated (i.e., symbol mapped) based on a particular modulation scheme (e.g., BPSK, QSPK, M-PSK, or M-QAM) selected for that data stream to provide modulation symbols. The data rate, coding, and modulation for each data stream may be determined by instructions performed by processor 230.

The modulation symbols for all data streams are then provided to a TX MIMO processor 220, which may further process the modulation symbols (e.g., for OFDM). TX MIMO processor 220 then provides NT modulation symbol streams to NT transmitters (TMTR) 222a through 222t. In certain embodiments, TX MIMO processor 220 applies beamforming weights to the symbols of the data streams and to the antenna from which the symbol is being transmitted.

Each transmitter 222 receives and processes a respective symbol stream to provide one or more analog signals, and further conditions (e.g., amplifies, filters, and upconverts) the analog signals to provide a modulated signal suitable for transmission over the MIMO channel. NT modulated signals from transmitters 222a through 222t are then transmitted from NT antennas 224a through 224t, respectively.

At receiver system 250, the transmitted modulated signals are received by NR antennas 252a through 252r and the received signal from each antenna 252 is provided to a respective receiver (RCVR) 254a through 254r. Each receiver 254 conditions (e.g., filters, amplifies, and downconverts) a respective received signal, digitizes the conditioned signal to provide samples, and further processes the samples to provide a corresponding "received" symbol stream.

An RX data processor 260 then receives and processes the NR received symbol streams from NR receivers 254 based on a particular receiver processing technique to provide NT "detected" symbol streams. The RX data processor 260 then demodulates, deinterleaves, and decodes each detected symbol stream to recover the traffic data for the data stream. The processing by RX data processor 260 is complementary to that performed by TX MIMO processor 220 and TX data processor 214 at transmitter system 210.

A processor 270 periodically determines which pre-coding matrix to use (discussed below). Processor 270 formulates a reverse link message comprising a matrix index portion and a rank value portion.

The reverse link message may comprise various types of information regarding the communication link and/or the received data stream. The reverse link message is then processed by a TX data processor 238, which also receives traffic data for a number of data streams from a data source 236, modulated by a modulator 280, conditioned by transmitters 254a through 254r, and transmitted back to transmitter system 210. Two or more receiver, transmitter, and antenna groups may be configured to access separate networks, for example an IEEE 802.11 WLAN network and an LTE, WCDMA, or cdma2000 HPRD network. In some embodiments, a single receiver, transmitter, and antenna group may be configured to access at least two separate networks. Similarly, a plurality of processors may be included to process communications and/or data for a plurality of networks. Further, a single processor may be configured to process communications and/or data for a plurality of networks.

At transmitter system 210, the modulated signals from receiver system 250 are received by antennas 224, conditioned by receivers 222, demodulated by a demodulator 240, and processed by an RX data processor 242 to extract the reserve link message transmitted by the receiver system 250. Processor 230 then determines which pre-coding matrix to use for determining the beamforming weights and then processes the extracted message.

As previously mentioned, one of the functions of H-SLP 142 is to provide location service to SET 116 and SET 122 communicating over IP or TCP/IP. In some instances, H-SLP 142 may not be able to adequately aid the SET in positioning. In these instances, a D-SLP may have a better ability than the H-SLP to aid the SET in positioning. In such instances, a D-SLP may be used to provide improved (e.g., localized) location service to a SET.

Additionally, the D-SLP may be operated by the same entity operating the H-SLP or it may be operated by a third party. The operator or provider of an H-SLP may negotiate with the operator or provider of a D-SLP to allow a SET to have access to the D-SLP as part of a business relationship between the H-SLP operator or provider and the D-SLP operator or provider. Furthermore, when a SET discovers a D-SLP, the SET may query its H-SLP for access rights to that D-SLP (e.g., type of service allowed, service area, service time window, etc.) through an authorization process.

In some embodiments, SUPL CS 146 may configure the same or similar information for D-SLPs to that provided by an H-SLP 142 when H-SLP 142 authorizes the D-SLPs (e.g., D-SLP 132, D-SLP 134). As a result, a SET 116 or 122 may know about D-SLPs using an authorization method using H-SLP 142 or a configuration method using SUPL CS 146. The configuration method using SUPL CS 146 is further defined herein.

The configuration method using SUPL CS 146 may be used to configure D-SLPs (e.g., D-SLP 132, D-SLP 134). In some implementations, SUPL CS 146 may configure an H-SLP, D-SLP and/or E-SLP belonging to: a mobile operator; a mobile virtual network operator (MVNO); a roaming partner; an original equipment manufacturer (OEM); an operating system provider, a modem provider or an application provider.

Configuration of SLPs by a SUPL CS 146 in a SET 116 or 122 may be desirable in order to (i) support the configuration of a large number of H/D/E-SLPs (e.g., hundreds or thousands); (ii) manage and avoid inconsistent and/or self-contradictory SLP assignments (e.g., where the same SLP is configured as both an H-SLP and a D-SLP for the same application); and/or (iii) follow the existing SUPL philosophy of using an H-SLP as an anchor point for SUPL location services.

Additionally, a purpose of SUPL CS 146 may be to allow SLP differentiation based on application identity. For instance, only a carrier's own applications may be permitted location access to the carrier's H-SLP. Other applications may need to have their own H-SLPs unless agreements are in place that allows access to the carrier's H-SLP.

Therefore, to simplify implementation while still meeting the requirement of SLP differentiation based on application identity, embodiments of the present invention disclose methods to: (i) configure only one H-SLP per application (e.g. where an application may have an identity or ID that is associated with at most one H-SLP); (ii) provide a default H-SLP to applications without an assigned H-SLP; (iii) allow configuration of multiple D/E-SLPs per H-SLP; and (iv) configure each configured SLP with additional configuration data.

Additional configuration data for an SLP may include, but is not limited to: an SLP Fully Qualified Domain Name (FQDN); an SLP type (H/D/E-SLP); association of the SLP when the SLP is an H-SLP with one or more D-SLPs and/or E-SLPs; conditions under which the SLP if the SLP is a D-SLP may be accessed by a SET; and/or conditions for E-SLP access. The conditions that may be configured by a SUPL CS 146 for D-SLP access and E-SLP access may be the same as or a subset of the conditions that an H-SLP 142 may indicate for D-SLP or E-SCP access when the H-SLP 142 is authorizing a D-SLP or E-SLP to a SET. More generally, the SLP data that is configured by a SUPL CS 146 related to a particular H-SLP 142 may be the same as or a subset of the data that may be authorized by the H-SLP 142 when the authorization method is used to configure data for D-SLPs and E-SLPs. This may enable either method of configuring SLP data to be used without the need for a SET that has been configured with the SLP data needing to take different actions as a consequence of the particular configuration method used. This may simplify the implementation of a SET. However, in contrast to the H-SLP authorization method of configuring SLP data, the SUPL CS method of configuring data may enable multiple H-SLPs to be configured in a SET with each H-SLP associated with a different set of applications. Furthermore, each configured H-SLP may be associated with its own set of D-SLPs and E-SLPs. When any application in a SET needs location services (e.g. needs the current location and/or current velocity of the SET), the SET (or a positioning engine in the SET) may make use of the H-SLP that has been assigned to the application or a D-SLP or E-SLP associated with this H-SLP. The rules defined in SUPL (e.g. in SUPL version 2.1 or SUPL version 3.0) may enable the SET or the positioning engine to determine whether to access the H-SLP for the application or a particular D-SLP or E-SLP associated with this H-SLP. The ability to associate any application with a distinct H-SLP may not be a capability that can be supported by the H-SLP authorization method of configuring SLP data in a SET. Hence, the SUPL CS method of configuration may be more flexible.

Figure 3A:
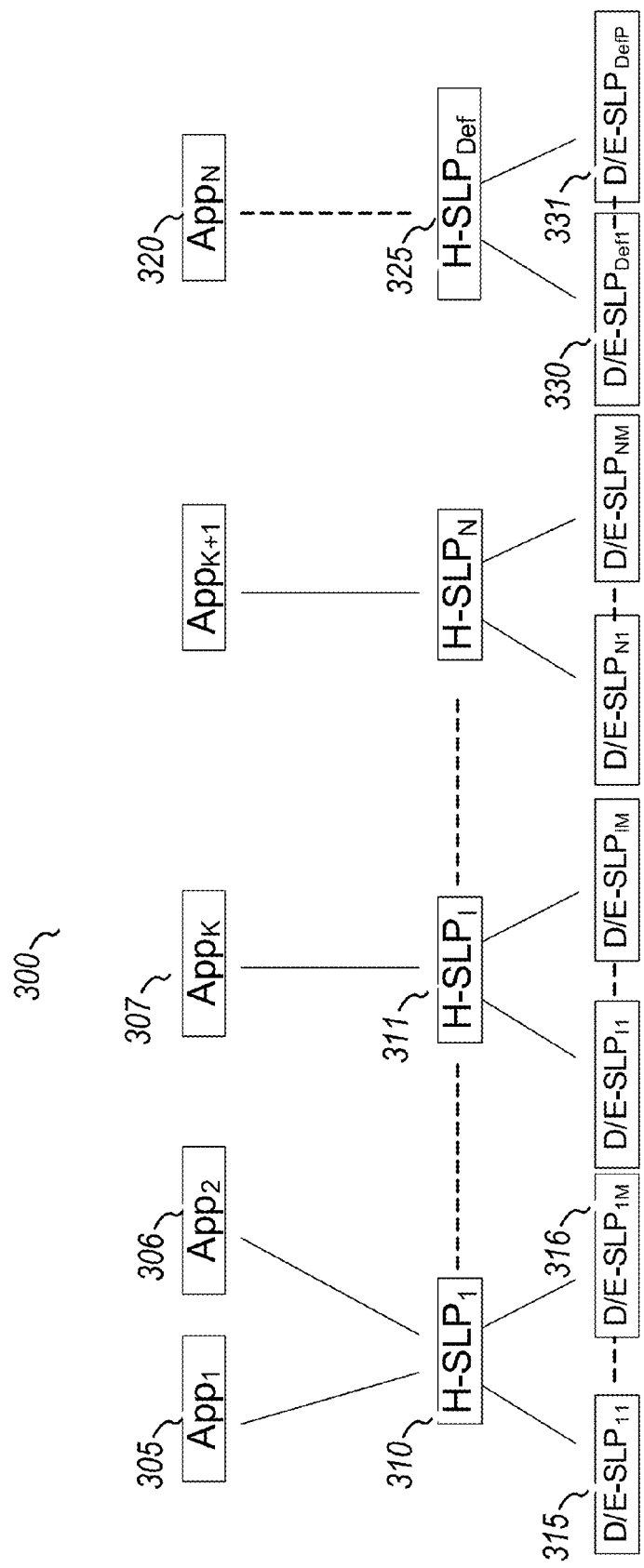
FIG. 3A illustrates an example system diagram describing configuration of information for SLPs, according to some embodiments.

FIG. 3A illustrates a system diagram 300 describing configuration of information for SLPs, according to some embodiments of the present invention. FIG. 3A shows N distinct applications (e.g. that each have distinct application IDs) that are numerically labeled from 1 to N where N≥1. FIG. 3A shows how each application may be associated with one H-SLP. In some cases, more than one application (e.g. $App_1$ and $App_2$ in FIG. 3A) may be associated with the same H-SLP. In other cases (e.g. H-SLP$_N$ in FIG. 3A), the application may be the only application to be associated with a particular H-SLP. FIG. 3A also shows a default H-SLP labeled H-SLP$_{Def}$ that may be associated with applications that do not have a configured H-SLP (in the case of FIG. 3A this is $App_N$). Each H-SLP in FIG. 3A that is associated with one or more applications may also have its own set of associated D/SLPs and/or E-SLPs. For example, in the case of H-SLP$_1$, this set of associated D-SLPs and/or E-SLPs is represented by D/E-SLP$_{11}$ up to D/E-SLP$_{1M}$. Note that while FIG. 3A shows the same number N of (non-default) H-SLPs and applications, the number of H-SLPs and number of applications may be different. Further, while FIG. 3A shows the same number M (where M≥0) of D/E-SLPs per H-SLP, the number of D/E-SLPs per H-SLP may also be different. FIG. 3A illustrates how SLPs may be configured in a SET by a SULP CS for a set of applications.

As illustrated in FIG. 3A, according to some embodiments, each application (e.g., application 150) may have one anchor SLP that may be a particular H-SLP (e.g., H-SLP 142) associated to the application. Additionally, there may be many H-SLPs defined depending on what the applications require. Moreover, each H-SLP (e.g., H-SLP 142) may have its own set of D/E-SLPs (e.g., D-SLP 132, D-SLP 134) defined.

In the example illustrated in FIG. 3A, H-SLP$_1$ 310 may be the anchor SLP for Application$_1$ 305. Continuing with the same example, H-SLP$_1$ 310 can also be the anchor SLP for Application$_2$ 306. Additionally, H-SLP$_1$ 310 may have its own set of D/E-SLPs (e.g., D/E-SLP$_{1i}$ 315 through D/E-SLP$_{1n}$ 316).

Moreover, H-SLP, 311 may be the anchor SLP for Application$_k$ 307. Continuing with the same example, H-SLP$_j$ 311 may have its own set of D/E-SLPs (e.g., D/E-SLP$_{j1}$ through D/E-SLP$_{jm}$).

Furthermore, applications (e.g., Application$_N$ 320) which do not have a pre-configured H-SLP may default to a default H-SLP$_{Def}$ 325. Such a default H-SLP 325 may be assigned to any application (e.g., Application$_N$ 320) that has not been assigned its own specific H-SLP. Default H-SLP 325 may have its own set of D-SLPs and E-SLPs (D/E-SLP$_{def1}$ 330 through D/E-SLP$_{defP}$ 331) which may be configured for default H-SLP 325 or authorized by default H-SLP 325. Finally, according to some embodiments, each D/E-SLP may have configured access rules consistent with D/E-SLP access rules already defined in SUPL 2.1 and SUPL 3.0.

FIG. 3B illustrates a mapping table for the applications in association with a corresponding H-SLP from system diagram 300, according to some embodiments. As previously mentioned, each application may have one anchor SLP, which may be an H-SLP specifically associated with the application. For example, Application$_1$ 305 can have H-SLP$_1$ 310 as its anchor SLP. Additionally, Application$_2$ 306 can also have H-SLP$_1$ 310 as its anchor SLP. Moreover, Application$_K$ 307 may have H-SLP$_j$ 311 as its anchor SLP. As previously mentioned, applications (e.g., application$_N$ 320) which do not have a pre-configured H-SLP may default to a default H-SLP 325.

FIG. 3C illustrates a mapping table for the D/E-SLPs in association with a corresponding H-SLP from system diagram 300, according to an embodiment. As previously mentioned, each H-SLP can have a set of D-SLPs and/or E-SLPs. As illustrated in FIGS. 3A and 3C, D/E-SLP 315 and D/E-SLP 316 can both be associated with H-SLP$_1$ 310. In a similar fashion, H-SLP$_I$, H-SLP$_N$ and default H-SLP 325 can each have its own set of D/E-SLPs.

Note that there may be additional data in the tables in FIG. 3B and FIG. 3C (not shown) for any additional H-SLPs and D/E-SLPs that are not explicitly shown in FIG. 3A (e.g. for an H-SLP$_2$ or H-SLP$_3$ etc. when N>3). The tables illustrated in FIG. 3B and FIG. 3C may provide one exemplary way to configure data by a SUPL CS 146 in a SET 116 regarding H-SLPs, D-SLPs and E-SLPs that should be used to support location services for different applications in SET 116. For example, data may be configured in conformance with these tables. In the case of the table in FIG. 3B, each application (e.g. Application 1) may be identified using a distinct application ID, application name and/or application provider. Each H-SLP may be identified using an FQDN and/or IP address. In the case of the table in FIG. 3C, each SLP may be identified by an FQDN and/or IP address together with an indication of whether an SLP is a D-SLP or E-SLP in the case of a D/E-SLP.

According to some embodiments, SUPL CS 146 may remove redundant and conflicting SLP assignments by maintaining an anchor SLP concept. By ensuring that each application has exactly one H-SLP, SUPL CS 146 may remove redundant and conflicting SLP assignments in which an application might otherwise be assigned the same SLP as both an H-SLP and a D-SLP (or E-SLP) for some other H-SLP assigned to the application. As a result, in some instances, the present invention may simplify provisioning and maintenance. Additionally, development and implementation may also be simplified. Furthermore, implementation in a SET may be done without introducing new rules for SLP access into SUPL. Thus, the system may be implemented in existing versions of SUPL.

SUPL CS 146 may implement some high-level functional requirements for provisioning or configuring the identities of SLPs (e.g., H-SLP, D-SLP, E-SLP) in the SET 116. The high-level functional requirements may include: supporting configuring multiple H-SLPs; supporting configuring one or more E-SLPs for each H-SLP; supporting configuring one or more D-SLPs for each H-SLP; keeping configuration information for an SLP consistent with SLP information defined in existing versions of SUPL in order to avoid new impacts to SUPL; permitting access of an application to only one configured H-SLP plus any D-SLPs and E-SLPs configured for or authorized by this H-SLP; and supporting authorization of an application. The high-level functional requirements are further described below.

In one or more arrangements, SUPL CS 146 may support configuring multiple H-SLPs. Additionally, SUPL CS 146 may support configuring one or more E-SLPs for each H-SLP. Moreover, SUPL CS 146 may support configuring one or more D-SLPs for each H-SLP. As previously mentioned, an H/D/E-SLP may be associated with (e.g., owned and operated by) a mobile operator, MVNO, OEM vendor, operating system provider, modem provider, mobile application provider or some other organization or entity.

In one or more arrangements, configuration information for an SLP may be consistent with SLP information defined in existing versions of SUPL in order to avoid new impacts to SUPL. As a result, for an H-SLP 142, configuration information may be limited to the H-SLP address. Additionally, for a D-SLP 132, configuration information may be the same as or a subset of D-SLP information provided by the H-SLP 142 using the D-SLP authorization method in SUPL 2.1 or SUPL 3.0 and may include the address of an associated H-SLP. Moreover, for an E-SLP, configuration information may be the same as or a subset of E-SLP information provided by an H-SLP 142 using the H-SLP authorization method in SUPL 3.0 and may include the address of an associated H-SLP.

In one or more arrangements, an application 150 can be permitted to access only one configured H-SLP 142 plus any D-SLPs (e.g., D-SLP 132, D-SLP 134) and E-SLPs configured for or authorized by the configured H-SLP 142. Additionally, an application that does not have a configured H-SLP may be permitted to access a default H-SLP 325 plus any D-SLPs (e.g., D-SLP 330, D-SLP 331) and any E-SLPs configured for or authorized by this default H-SLP.

In one or more arrangements, SUPL CS 146 can support authorization of an application 150. Information provided to a SET 116 as part of application authorization can include, but not be limited to, the application ID (e.g., SUPL 2.0 application ID), the address of an H-SLP and may include a time duration after which re-authorization of the application is required.

According to some embodiments, SUPL CS 146 can enable multiple SLPs (e.g., H-SLPs, D-SLPs and E-SLPs) to be configured for any SET by using a device management (DM) capability. The DM capability may be operated by the home network operator and may be supported by the SUPL CS 146.

In one or more arrangements, DM can allow third parties to carry out the configuring of mobile devices (e.g., SET 116). Third parties can typically be wireless operators, service providers or corporate information management departments. Through DM, an external party can remotely set parameters, conduct troubleshooting servicing of terminals, or install or upgrade software.

SUPL CS 146 may configure information for SLPs that a SET 116 is allowed to access to request SUPL location services. Such requested services may include request and receipt of assistance data (AD), location on demand and periodic and triggered location provision. The configured information for any SLP may include the SLP address and any limitations or conditions for accessing the SLP such as a geographic area the SET 116 must be within in order to access a particular SLP, one of a number of access networks the SET 116 must be using in order to access an SLP, and certain days in the week or times of day at which access is allowed.

Additionally, SUPL CS 146 may also configure which applications in the SET 116 are either allowed or required to access particular SLPs. The configuration information for an application may include the addresses of allowed or required SLPs, and possibly a preference for accessing particular SLPs.

However, in some implementations, a SUPL CS may not be able to determine which applications are running in a SET 116 in advance when configuring application information. Therefore, it may not be possible to configure SLP and application information together (e.g., via DM) for the particular applications in a SET 116, thereby making it necessary to configure information for all possible applications that may be in a SET 116. While configuring information for all possible applications may be feasible in principle, the potentially very large number of applications (e.g. possibly thousands) for which this may be needed may render this inefficient and impractical. Hence, it may be preferred to configure information only for the applications that are actually running in a SET 116 which may not be possible in advance using DM. Additionally, some applications may masquerade as other applications that have a configured H-SLP in order to obtain unauthorized SUPL service from this configured H-SLP (and/or from any D-SLPs or E-SLPs associated with this configured H-SLP). Therefore, some form of authentication of an application may be required.

Therefore, according to some embodiments, configuring the SLP and application information may be implemented using two separate procedures, as described below. The two separate procedures may include: configuring SLP information in a SET; and configuring information for applications. In some implementations, the procedure to configure SLP information in a SET may provide data that includes or is the same as the data exemplified in FIG. 3C. In some implementations, the procedure to configure information for applications in a SET may provide data that includes or is the same as the data exemplified in FIG. 3B. The fact that SLP configuration data (e.g. as exemplified by system diagram 300 in FIG. 3A) can be split into two separate data sets, as exemplified by the separate tables in FIG. 3B and FIG. 3C, may enable configuration using two separate procedures as described further down without introducing additional complexity (e.g. as compared to configuring all data using just one procedure).

Configuring SLP Information in a SET (First Procedure)

For example, a first procedure may be used to configure SLP information in a SET 116 including the conditions for accessing any configured SLP (such as being within a defined geographic area, using one of an allowed set of access networks and accessing the SLP only on certain days or at certain times). In some instances, the first procedure may not configure any information for applications. Additionally, the first procedure may be instigated from the SUPL CS 146 under the control of the SUPL CS operator.

With this first procedure, the SUPL CS may configure one or more H-SLPs (e.g., H-SLP 142, H-SLP 310) in a SET 116. Additionally, for each configured H-SLP, the SUPL CS 146 may configure one or more D-SLPs and/or E-SLPs (e.g., D-SLP 132, D-SLP 134). Configured information for each H-SLP may be limited to just the address (e.g. FQDN) of the H-SLP. Configured information for each D-SLP and E-SLP may include the address (e.g. FQDN) of the D-SLP or E-SLP and restrictions on accessing the D-SLP or E-SLP by the SET 116 such as requiring SET 116 to be within a defined geographic area or to be served by a particular access network. To avoid impacting existing versions of SUPL, the information configured for an H-SLP, D-SLP or E-SLP may be restricted to being the same as or a subset of the information already defined for the method of authorizing D-SLPs and E-SLPs by an H-SLP in existing versions of SUPL for these SLPs.

As previously mentioned, according to some embodiments, the following can occur: For an H-SLP, configuration information is limited to the H-SLP address; for a D-SLP, configuration information is the same as or a subset of D-SLP information provided for authorization by an H-SLP in SUPL 2.1 or SUPL 3.0 and includes the address of an associated H-SLP; and for an E-SLP, configuration information is the same as or a subset of E-SLP information provided for authorization by an H-SLP in SUPL 3.0 and includes the address of an associated H-SLP.

According to some embodiments, when more than one H-SLP 142 is configured, it may be a problem for a SET 116 to determine which H-SLP 142 to use to obtain location services. To avoid introducing additional impacts into SUPL, each application inside a SET 116 that requests location services from the SET 116 may be restricted to using one particular H-SLP 142. Thus, when the application requests location services, the SET 116 will know which H-SLP 142 to access. In the case that one or more D-SLPs (e.g., D-SLP 132, D-SLP 134) and/or E-SLPs have been configured for this H-SLP, the SET 116 can also be permitted to access a particular configured D-SLP 132 or E-SLP for the H-SLP 142.

The conditions for accessing a configured D-SLP or E-SLP may be the same as those defined in SUPL 2.1 and SUPL 3.0 for accessing a D-SLP or E-SLP authorized by an H-SLP. These conditions may define which SLP a SET should access from a choice consisting of an H-SLP, a set of zero or more D-SLPs associated with this H-SLP and a set of zero or more E-SLPs associated with this H-SLP. For location support for emergency services (e.g. an emergency 911 call in North America or emergency 112 call in Europe), an E-SLP may be chosen. For non-emergency location services, the H-SLP or a D-SLP may be chosen. The rules in SUPL version 2.1 and SUPL version 3.0 define which particular SLP a SET should make use of (e.g. when establishing a SUPL session) in the case of non-emergency location services and may provide some narrowing of choice in the case of location support for emergency services. In some instances, a D-SLP or E-SLP that is configured in association with a particular H-SLP may be treated by the SET in an identical manner to a D-SLP or E-SLP that has been authorized (according to the rules and procedures in SUPL) by the H-SLP. This may enable support by a SET of configured D-SLPs and E-SLPs without adding additional impacts and complexity to a SET assuming the SET already supports access to D-SLPs or E-SLPs that have been authorized by an H-SLP. For example, the only difference between a configured D-SLP or E-SLP and an authorized D-SLP or E-SLP may be that the configured D-SLP or E-SLP has no time limit regarding usage, and thus may be treated by the SET the same as a permanently authorized D-SLP or E-SLP.

To illustrate the first procedure, an exemplary method is described. SUPL CS 146 can configure information for a number of SLPs which may be a single H-SLP 142 and a number of D-SLPs (e.g., D-SLP 132, D-SLP 134). Alternatively, it may be multiple H-SLPs and a number of associated D-SLPs for each H-SLP. The information configured can include the address of each SLP. For example, the address can be the fully qualified domain name of the SLP which can be looked up by a SET using a Domain Name System (DNS) server in order to get an IP address for the SLP whenever communication with the SLP is required. The configured information can also include the conditions for accessing an H-SLP versus associated D-SLP. For an H-SLP, configured information can indicate if the H-SLP is a default H-SLP 325 that is available to provide service for any application that is not assigned its own specific H-SLP. When more than one default H-SLP is configured, additional information may be configured for each default H-SLP such as its priority and conditions under which it may be accessed. A default H-SLP may be assigned specifically to some applications as well as being available to applications that have no assigned H-SLP.

For example, for each D-SLP, the system can provide some associated network identities and optionally a geographic area, and then when the SET uses any of those indicated networks or is within the geographic area, the SET can know to access a particular D-SLP. Additionally, if the SET is in some other geographic area or accessing a different network, then the SET can know to use a different D-SLP or the H-SLP.

Configuring Information for Applications (Second Procedure)

According to some embodiments, the second procedure can be used to configure information for applications. For example, it can be used to configure the single H-SLP (e.g., H-SLP 142) that any application (App) (e.g., application 150) is allowed to use to obtain location services. For example, the second procedure may operate as described according to the process 400 shown in FIG. 4A.

Figure 4A:
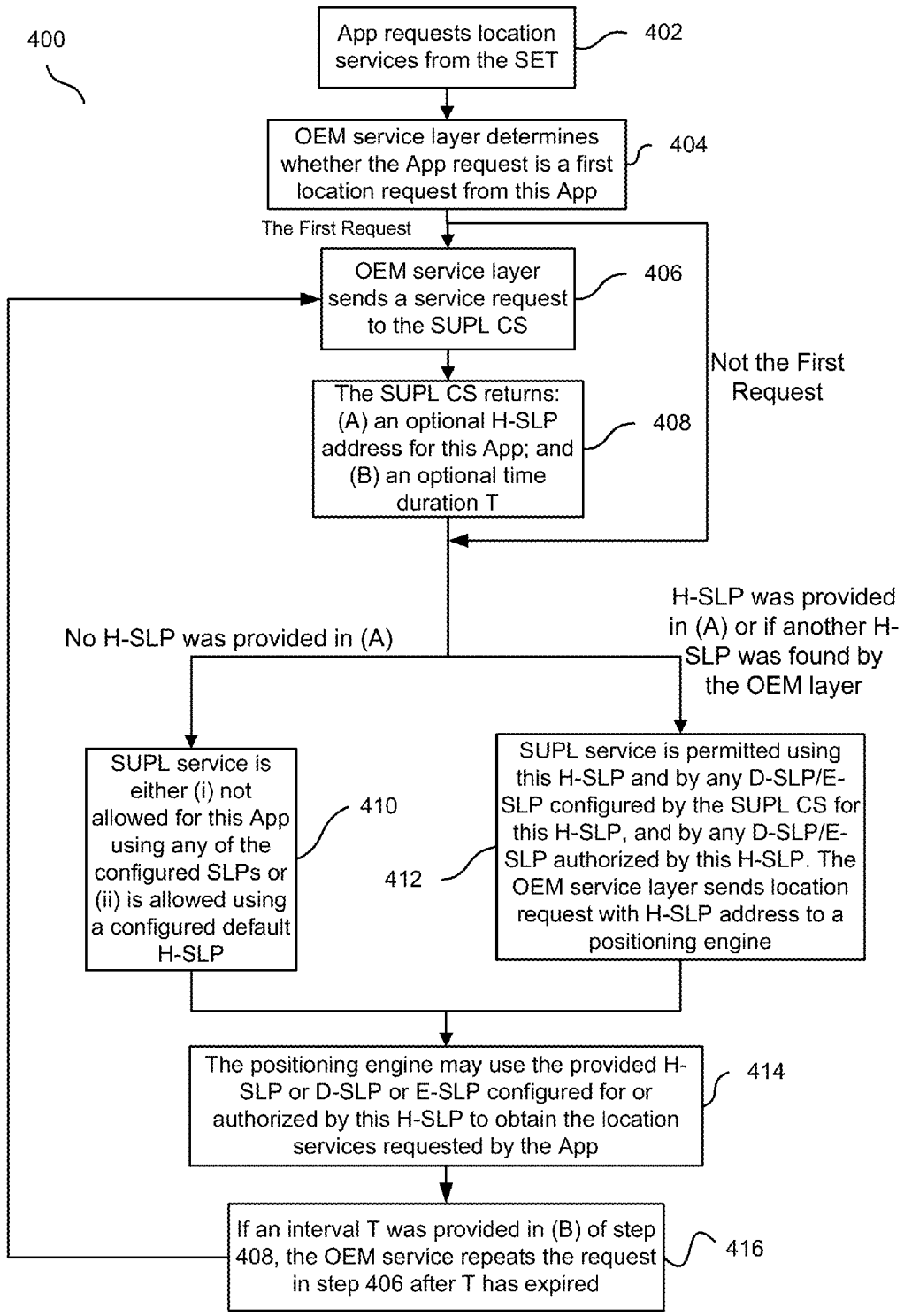
FIG. 4A is a flowchart describing the configuration of information for applications, according to some embodiments.

Referring now to FIG. 4A, at 402 in process 400, an App (e.g., application 150) requests location services from SET 116 (e.g. via a location request for the current location and/or current velocity of SET 116 that may be conveyed using some High Level Operating System (HLOS) Application Program Interface (API)). The App may provide an App name and an App provider name for identification. The request may be sent to some OEM service layer on SET 116 (e.g. which may be part of an operating system on SET 116) that services location requests for all Apps on the SET 116.

At 404, the OEM service layer determines whether this is the first location request from the App. For example, when there is no stored record for a previous location service request for this App, it may be assumed that this is the first location request from this App since SET 116 was acquired by the SET user or since the App was downloaded to SET 116 (e.g. from an App store) by the user of SET 116. If this is not the first location request for the App, the OEM service layer may retrieve (i) any H-SLP address previously stored for the App and corresponding to the H-SLP address returned in (A) in step 408 and (ii) any time duration T stored for the App corresponding to a time duration T returned in (B) in step 408. The storage of these items may have occurred earlier when step 408 was performed for the first location request for the App. The OEM service layer may then proceed to step 410 or step 412 as described below for step 408 according to whether an H-SLP address was or was not obtained for the App.

If the OEM service layer determines that the location request in 402 is the first location request from the App, then at 406, the OEM service layer sends a service request to SUPL CS 146 together with identification information for the App. In some instances, the address of SUPL CS 146 may have been configured on SET 116 along with allowed SLPs by the SUPL CS 146 using the first procedure described earlier herein. Additionally, the identification information for the App can include the App provider name and App name received at 402.

At 408, SUPL CS 146 can return an optional H-SLP address for this App and an optional time duration T. If these items are returned, the OEM service layer records the App identity (e.g. provider name and App name), the time duration T and the address of the provided H-SLP or the address of an alternate H-SLP such as a configured default H-SLP (e.g., default H-SLP 325), in order to avoid repeating the request at 406 and 408 the next time the App submits a location request. The storage of these items may be consistent with the mapping table described in association with FIG. 3B. If these items are not returned, the OEM service layer may store an indication that they were not returned.

If no H-SLP address is provided at 408, then at 410, the SUPL service is either (i) not allowed for the App using any of the configured SLPs or (ii) is allowed using a configured default H-SLP 325. In some instances, even when the SUPL service is not allowed for the App using any of the configured SLPs, the App may be allowed access to SUPL service using some other non-configured SLP such as an HLOS or OEM vendor SLP.

Additionally, if an H-SLP address is provided at 408, or if another H-SLP was found by the OEM layer (e.g. a configured default H-SLP) then, at 412, the App is permitted to receive SUPL service from this H-SLP (e.g., H-SLP 142) and from any D-SLP (e.g., D-SLP 132, D-SLP 134) or E-SLP configured by the SUPL CS 146 for this H-SLP (e.g. according to the first procedure described earlier herein) and from any D-SLP or E-SLP authorized by this H-SLP according to H-SLP authorization methods defined in SUPL version 2.1 or SUPL version 3.0. The OEM service layer then sends the location request received at 402 together with the H-SLP address to a positioning engine. In some embodiments, the OEM service layer and the positioning engine may be the same entity (e.g., the same process or program).

At 414, the positioning engine may use the provided H-SLP (e.g., H-SLP 142) or a D-SLP (e.g., D-SLP 132) or E-SLP configured for or authorized by the H-SLP (e.g., H-SLP 142) to obtain the location services requested by the App (e.g., application 150). The positioning engine may also satisfy any access restrictions configured by the first procedure, or authorized by the H-SLP, for any of the D-SLPs or E-SLPs.

At 416, if an interval T was provided at 408, the OEM service layer repeats the request at 406 for the first location service request received from the App after T has expired. In some instances, this may apply even when no H-SLP was provided at 408 and allows an operator to change the permitted H-SLP (e.g., H-SLP 142) periodically for each App (e.g., application 150). After repetition of the request at 406, SUPL CS 146 may repeat step 408 to change the H-SLP assigned to the App or provide the same H-SLP as before.

According to some embodiments, the above procedures decouple SLP configuration from App configuration allowing both to run independently. For example, SUPL CS 146 can reconfigure information for SLPs (e.g. change the association of D-SLPs and E-SLPs to H-SLPs and/or change the conditions for accessing particular SLPs) by rerunning the first procedure without affecting App configuration information. SUPL CS 146 may similarly change the assignment of an H-SLP to an application whenever steps 406 and 408 in the second procedure are performed without affecting SLP configuration information. In some instances, the second procedure described above may be invoked only when an App requests location services and may not affect the procedures used to download new Apps by the user.

Additionally, an application may optionally provide a digital signature to authenticate the application. This is to guard against applications trying to masquerade as other applications and obtain unauthorized location services using SUPL. For example, some application developer may write an application for which location services are needed, and it may turn out that the application does not have any associated SUPL location provider. However, the application developer may use an application name associated with some other authorized application in order to obtain location services by masquerading as this other application. Providers of SLPs may want to prevent this from occurring in order to ensure that authorized applications receive better location services than unauthorized applications—e.g. which may lead to greater usage of authorized applications and hence higher revenue for the providers of these applications, who may in turn provide some revenue to the providers of the SLPs used by these applications. In some other cases, the SLP and authorized App providers may be the same providers.

The request going to the SUPL CS (e.g. in step 406 of process 400) can include the application name, the provider of the application, and a digital signature for authentication. The digital signature may be a signature for data that includes the application name, application provider name and possibly the current date or current date and time and may be computed (e.g. by the application or in advance by the application developer) using a secret key for the application provider. By including the date and time for the digital signature, it may be difficult or impossible for some application that does not know the secret key to produce the digital signature. Even when a current date or current date and time is not included, it may be difficult for another application to reproduce the digital signature if the secret key is kept confidential and if the digital signature is transferred to the SUPL CS using a secure communications link. When the SUPL CS receives the request, the SUPL CS may first authenticate the identity of the application using the digital signature and may then determine whether or not that application is allowed to receive SUPL location services. If the application is allowed, then the SUPL CS can return the address of an H-SLP and possibly the addresses of some associated D-SLPs back to the SET (e.g. as in step 408 of process 400).

Splitting the SUPL CS configuration into two separate procedures as described above can provide greater efficiency in the present invention.

Authentication of an Application

According to some embodiments of the present invention, SUPL CS 146 can support the following authentication requirements: SUPL CS 146 can utilize the authentication mechanisms defined in OMA DM; and SUPL CS 146 can support authentication of an application as part of authorization of the application.

Additionally, the second procedure as described in FIG. 4A can include support for App (e.g., application 150) authentication to avoid one App masquerading as another and obtaining unauthorized location services from some SLP. This can be supported by the App providing a digital signature that is included in the original request at 402 and in the request sent to the SUPL CS at 406 in FIG. 4A. The digital signature can be computed by the App over the App name and the provider name and possibly over a date or date and time that may also be included in the requests at 402 and 406. The computation may make use of a secret key known to both the App (e.g. application 150) and SUPL CS 146 but not to other entities. Alternatively, the computation may make use of a private key known only to the App. The digital signature may be verified by SUPL CS 146 at 408—e.g. by using the same secret key that was used by the App to produce the digital signature or by using a public key counterpart to any private key used by the App to produce the digital signature. The SUPL CS 146 can then return a new App ID for the App (e.g. the SUPL 2.0 Application ID) at 408 that can be used in SUPL sessions with configured SLPs. The OEM service layer may then need to retain and store the App ID, the App name, the provider name and the digital signature that were received at 402 as well as the App ID received at 408. The app name, provider name and digital signature may also or instead be hashed by the OEM service layer and then stored to reduce storage and make comparison simpler for future location requests. The app and providers names and digital signature can identify the App for future location requests. In any later location request from the App at a later time, the App may again provide the App name, provider name and the digital signature. Preferably, the digital signature should be the same digital signature received earlier at 402, which implies that the digital signature is not recomputed by the App for any new date or new date and time corresponding to the new location request. The OEM service layer may then use the stored App name, provider name and digital signature to verify the App identity. Alternatively, if the OEM service layer stored a hash of the App name, provider name and digital signature, the OEM service layer may compare the stored hash with a hash of the newly provided App name, provider name and digital signature to verify the App identity. The OEM service layer may then include the stored App ID when transferring the location request to the positioning engine to identify the App in any SUPL location session between the positioning engine and a configured or authorized SLP.

Figure 4B:
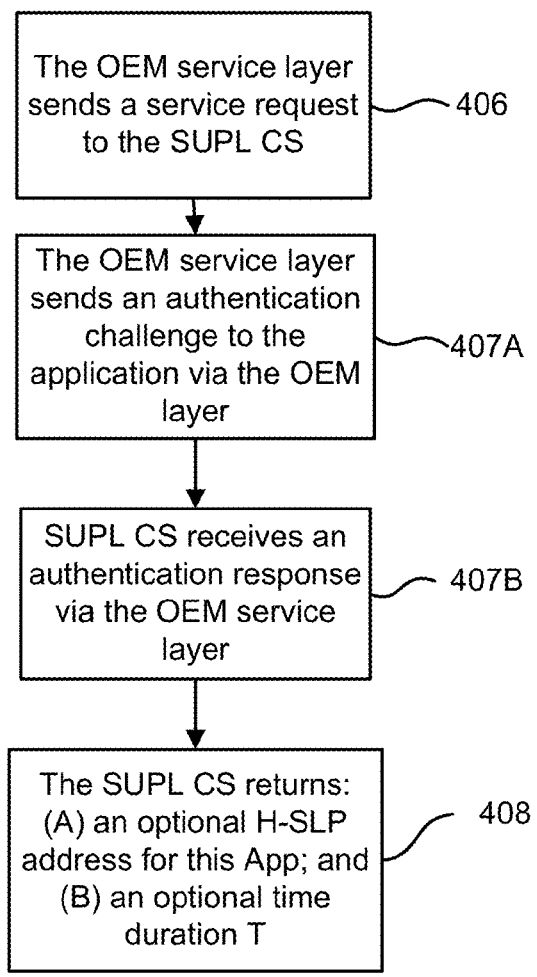
FIG. 4B is a flowchart describing an authentication method, according to some embodiments.

Now referring to FIG. 4B, another method of authentication 450 is disclosed according to some embodiments of the present invention. FIG. 4B illustrates a method with an authentication request between 406 and 408 of FIG. 4A.

After the OEM service layer sends a service request to SUPL CS 146 at 406, SUPL CS 146 can send an authentication challenge to the App via the OEM service layer at 407A.

At 407B, SUPL CS 146 can receive an authentication response from the App sent via the OEM service layer. Such a challenge and/or response can use any one of a number of well-known authentication methods. For example, the SUPL CS 146 may include a random value (e.g. a random bit string) and a date and time in the authentication challenge and the App can include a value (e.g. a bit string) in the authentication response computed using the random value, the date and time and a secret authentication key known only to the App and the SUPL CS 146.

According to this embodiment, any App ID returned by SUPL CS 146 at 408 may be stored by the OEM service layer and provided to the App (e.g., application 150) which would then use the new App ID for identification in future location requests at 402 (e.g. with the OEM service layer then using the App ID to verify the App identity). SUPL CS 146 can periodically change the App ID whenever T has expired at 416 to prevent other non-authorized Apps from learning and using the same App ID.

Figure 4C:
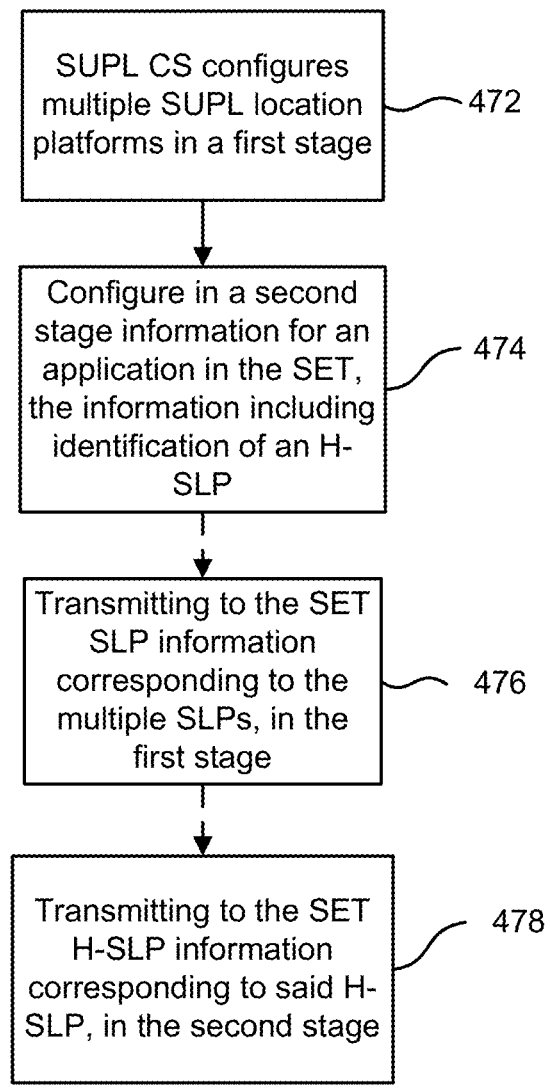
FIG. 4C is a flowchart describing methods for configuring information by a SUPL CS, according to some embodiments.

Referring to FIG. 4C, flowchart 470 describes a summary process by a SUPL CS for configuring the SLPs with one or more applications in the SET, according to some embodiments. This example flowchart may be consistent with the configuration processes described in association with FIGS. 3A-C and 4A. For example, at block 472, a SUPL CS may configure multiple SUPL location platforms (SLPs) in a first stage. The configuration in this first stage may include associating D-SLPs and/or E-SLPs with an H-SLP, consistent with the descriptions in FIGS. 3A and 3C. The configuration in this first stage may also include providing information for each configured SLP—e.g. the SLP address and the conditions under which the SLP may be accessed. Information configured for a D-SLP or E-SLP may be the same as or a subset of information defined in SUPL version 2.1 or SUPL version 3.0 that may be provided by an H-SLP to a SET for authorization of a D-SLP or E-SLP. The SUPL CS may derive the information necessary to properly configure the multiple SLPs from a service provider, for example. In some embodiments one H-SLP may have associated with it multiple D/E-SLPs. In some embodiments, the SUPL CS may, as part of the configuration, designate one H-SLP to be a default H-SLP, and may associate one or more D/E-SLPs with the default H-SLP.

At block 474, the SUPL CS may configure, in a second stage, information for an application in the SET. The information for the application described herein may include an identification of an H-SLP, such that the application may now be associated with said H-SLP, consistent with the descriptions in FIGS. 3A and 3B. The SUPL CS may derive the information for configuring the application with said H-SLP from a service provider, for example. In some embodiments, one H-SLP may have associated with it multiple applications. The configuration in the second stage may occur separately or independently of the first stage and may be consistent with the SUPL CS actions described in association with step 408 in FIG. 4A. Because the configurations in the first and second stages may be independent of each other, the SET containing the application only needs to know what H-SLP is associated with the application. The D/E-SLPs associated with said H-SLP can then change or be reconfigured, and the SET can then simply follow whatever the new association of D/E-SLPs are, in the event the SET then needs to interact with a D/E-SLP because said H-SLP is otherwise unavailable, suboptimal or not preferred (e.g. by the service provider for the H-SLP).

Figure 4D:
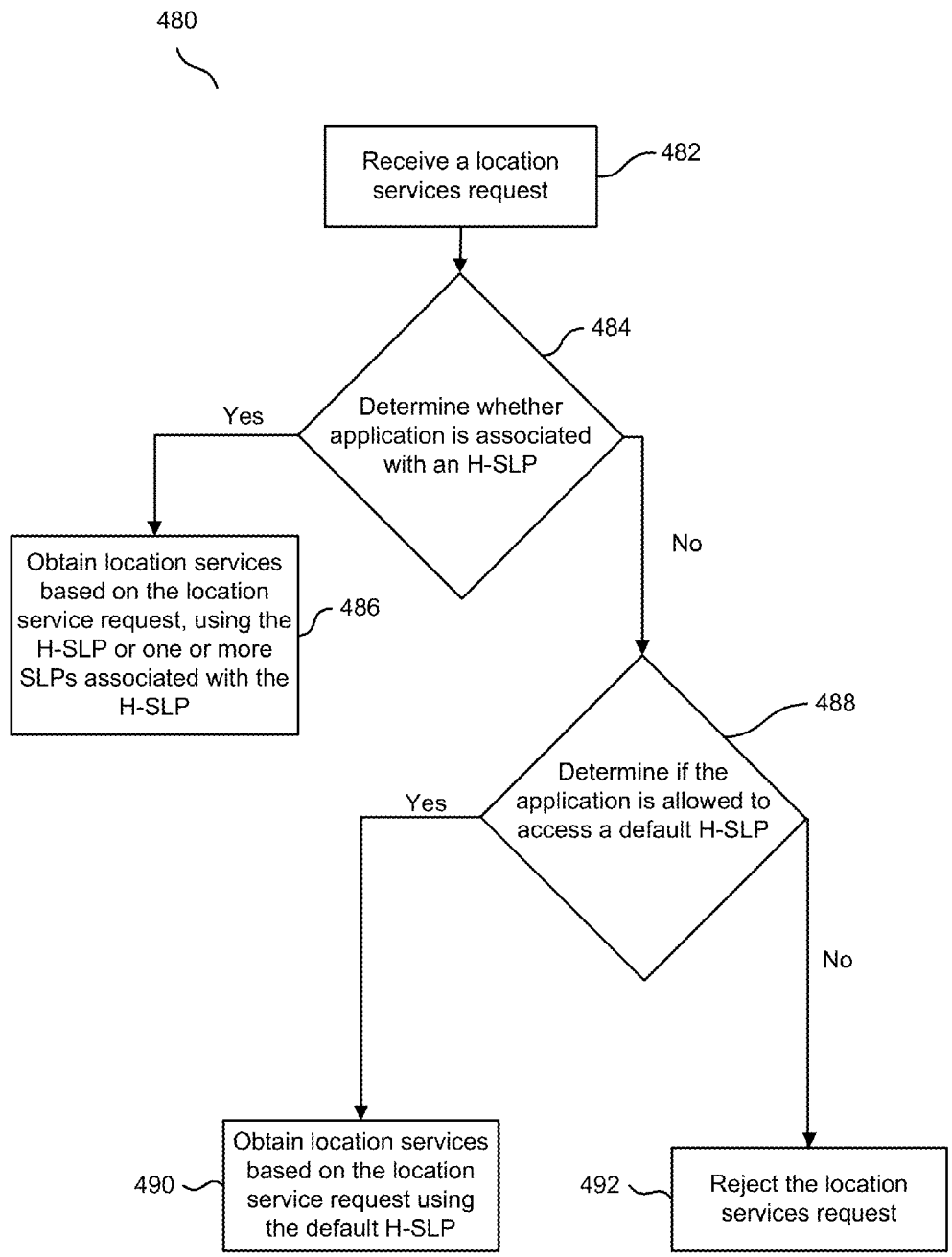
FIG. 4D is a flowchart describing methods for obtaining location services by a SET, according to some embodiments.

Referring to FIG. 4D, flowchart 480 illustrates example methods for a SET to obtain location services for an application running on the SET, according to some embodiments. This example method may be consistent with the descriptions associated with FIGS. 1A-C, 2, 3A-C, 4A and 4B. For example, at block 482, the SET (or a process, operating system or service layer on the SET) may receive a location services request. The location services request may originate from the application running on or associated with the SET.

At block 484, the SET may determine whether the application is associated with any particular H-SLP. For example, the SET may refer to a database or table consistent with the descriptions in FIG. 3B.

At block 486, if it is determined that the application is associated with a particular H-SLP, then the SET may obtain location services based on the location service request, using the H-SLP or one or more SLPs associated with the H-SLP. The SET may refer to a database or table consistent with the descriptions in FIG. 3C, for example, in order to find which other SLPs are associated with the H-SLP.

At block 488, if it is determined that the application is not associated with a particular H-SLP, then the SET may make another determination, whether the application is allowed to access a default H-SLP. This information may be found in, for example, a database or table consistent with the descriptions in FIG. 3B.

At block 490, if it is determined that the application is allowed to access a default H-SLP, then the SET may obtain location services based on the location service request using the default H-SLP. In some embodiments, the SET may also or alternatively use any D/E-SLP associated with the default H-SLP. The motivations for doing this may be consistent with any of the motivations described herein or others apparent to those with skill in the art.

At block 492, if it determined that the application is not allowed to access the default H-SLP, then the location services request may be rejected.

In some embodiments, additional processing may be performed if the location services request is the first request from the application. For example, in this case, following block 482 and prior to block 484, the SET may also transmit a service request to a SUPL Configuration Server (CS), wherein the service request includes information associated with the application. The SET may then receive an address of the H-SLP from the SUPL CS, if it is determined by the SUPL CS that the application is associated with an H-SLP, and the SET may store the received address of the H-SLP associated with the application. In other words, the SET may obtain configuration information from a SUPL CS the first time an application requests location services. The SET may then store the configuration information locally, so as to optimize time and battery life. In some embodiments, a time duration associated with the authorized SLP may be received from the SUPL CS, such that if the time duration has expired, then the SET may need to obtain new configuration information from the SUPL CS again to determine what SLP the application may be authorized to access, if any.

Interoperability

According to some embodiments of the present invention, SUPL CS 146 can support the following interoperability requirements: SUPL CS 146 can be independent of the OMA DM release; SUPL CS 146 can be independent of the SUPL release with some restrictions; and a mobile operator may utilize the SUPL management object to define their H-SLP (e.g., H-SLP 142) or SUPL CS 146. In some instances, SUPL CS 146 can be independent of the SUPL release with the following restrictions: D-SLP 132 may only be configured in association with SUPL 2.1 and later versions; and an E-SLP may only be configured in association with SUPL 3.0 and later versions.

Figure 5:
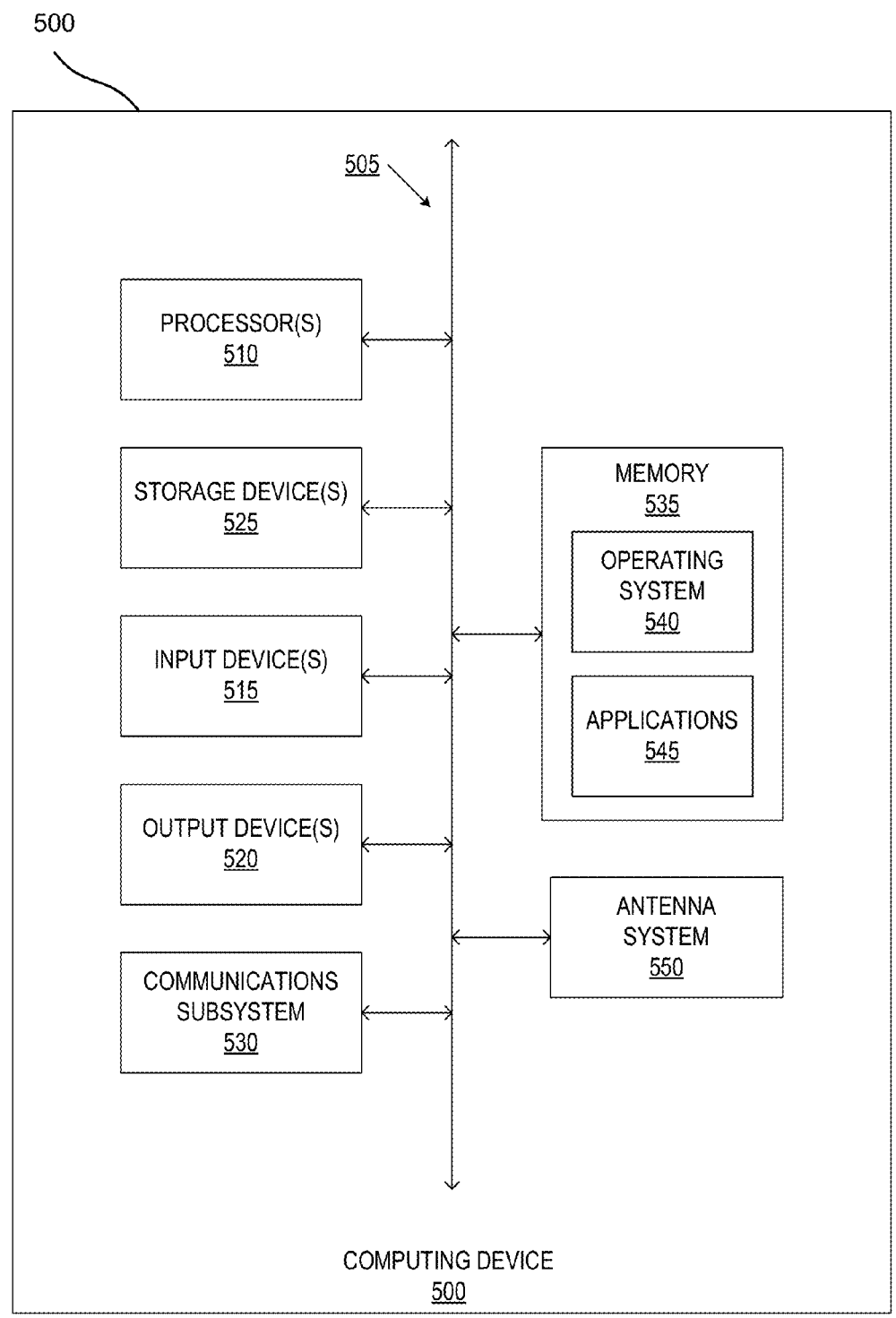
FIG. 5 is an exemplary computer system of various embodiments.

Having described multiple aspects of enabling multiple SLPs to be configured for any terminal (e.g., SET), an example of a computing system in which various aspects of the disclosure may be implemented may now be described with respect to FIG. 5. According to one or more aspects, a computer system as illustrated in FIG. 5 may be incorporated as part of a computing device, which may implement, perform, and/or execute any and/or all of the features, methods, and/or method steps described herein. For example, computer system 500 may represent some of the components of a hand-held device, such as SET 116 and SET 122. A hand-held device may be any computing device with an input sensory unit, such as a camera and/or a display unit. Examples of a hand-held device include but are not limited to video game consoles, tablets, smart phones, and mobile devices. In one embodiment, the system 500 is configured to implement the mobile device (e.g., SET 116) described above. In other embodiments, system 500 may represent some of the components of a SUPL CS 146, an H-SLP 142 or a D-SLP 132 or 134. FIG. 5 provides a schematic illustration of one embodiment of a computer system 500 that can perform the methods provided by various other embodiments, as described herein, and/or can function as the host computer system, a remote kiosk/terminal, a point-of-sale device, a mobile device, a set-top box, and/or a computer system. FIG. 5 is meant only to provide a generalized illustration of various components, any and/or all of which may be utilized as appropriate. FIG. 5, therefore, broadly illustrates how individual system elements may be implemented in a relatively separated or relatively more integrated manner.

The computer system 500 is shown comprising hardware elements that can be electrically coupled via a bus 505 (or may otherwise be in communication, as appropriate). The hardware elements may include one or more processors 510, including without limitation one or more general-purpose processors and/or one or more special-purpose processors (such as digital signal processing chips, graphics acceleration processors, and/or the like); one or more input devices 515, which can include without limitation a camera, a mouse, a keyboard and/or the like; and one or more output devices 520, which can include without limitation a display unit, a printer and/or the like. The one or more processors 510 can be used to implement the methods described in FIG. 4A and FIG. 4B.

The computer system 500 may further include (and/or be in communication with) one or more non-transitory storage devices 525, which can comprise, without limitation, local and/or network accessible storage, and/or can include, without limitation, a disk drive, a drive array, an optical storage device, a solid-state storage device such as a random access memory ("RAM") and/or a read-only memory ("ROM"), which can be programmable, flash-updateable and/or the like. Such storage devices may be configured to implement any appropriate data storage, including without limitation, various file systems, database structures, and/or the like.

The computer system 500 might also include a communications subsystem 530, which can include without limitation a modem, a network card (wireless or wired), an infrared communication device, a wireless communication device and/or chipset (such as a Bluetooth® device, an 802.11 device, a WiFi device, a WiMax device, cellular communication facilities, etc.), and/or the like. The communications subsystem 530 may permit data to be exchanged with a network (such as the network described below, to name one example), other computer systems, and/or any other devices described herein. In many embodiments, the computer system 500 may further comprise a non-transitory working memory 535 (e.g., memory 232, memory 272 in FIG. 2), which can include a RAM or ROM device, as described above.

The computer system 500 also can comprise software elements, shown as being currently located within the working memory 535, including an operating system 540, device drivers, executable libraries, and/or other code, such as one or more application programs 545, which may comprise computer programs provided by various embodiments, and/or may be designed to implement methods, and/or configure systems, provided by other embodiments, as described herein. Merely by way of example, one or more procedures described with respect to the method(s) discussed above, for example as described with respect to FIGS. 4 A-B, might be implemented as code and/or instructions executable by a computer (and/or a processor within a computer); in an aspect, then, such code and/or instructions can be used to configure and/or adapt a general purpose computer (or other device) to perform one or more operations in accordance with the described methods. For example, application 150 may be part of applications 545 in some embodiments as may the OEM service layer and positioning engine referred to in the methods of FIG. 4A and FIG. 4B.

A set of these instructions and/or code might be stored on a computer-readable storage medium, such as the storage device(s) 525 described above. In some cases, the storage medium might be incorporated within a computer system, such as computer system 500. In other embodiments, the storage medium might be separate from a computer system (e.g., a removable medium, such as a compact disc), and/or provided in an installation package, such that the storage medium can be used to program, configure and/or adapt a general purpose computer with the instructions/code stored thereon. These instructions might take the form of executable code, which is executable by the computer system 500 and/or might take the form of source and/or installable code, which, upon compilation and/or installation on the computer system 500 (e.g., using any of a variety of generally available compilers, installation programs, compression/decompression utilities, etc.), then takes the form of executable code.

Substantial variations may be made in accordance with specific requirements. For example, customized hardware might also be used, and/or particular elements might be implemented in hardware, software (including portable software, such as applets, etc.), or both. Further, connection to other computing devices such as network input/output devices may be employed.

Some embodiments may employ a computer system (such as the computer system 500) to perform methods in accordance with the disclosure. For example, some or all of the procedures of the described methods may be performed by the computer system 500 in response to processor 510 executing one or more sequences of one or more instructions (which might be incorporated into the operating system 540 and/or other code, such as an application program 545) contained in the working memory 535. Such instructions may be read into the working memory 535 from another computer-readable medium, such as one or more of the storage device(s) 525. Merely by way of example, execution of the sequences of instructions contained in the working memory 535 might cause the processor(s) 510 to perform one or more procedures of the methods described herein, for example a method described with respect to FIG. 4.

In some embodiments, system 500 may include an antenna system 550 (e.g. comprising a single antenna or multiple antennas) which may be coupled to communications system 530 to enable wireless communication. Antenna system may correspond to or include any of antennas 224a-224t, 252a-252r in system 200.

The terms "machine-readable medium" and "computer-readable medium," as used herein, refer to any medium that participates in providing data that causes a machine to operate in a specific fashion. In an embodiment implemented using the computer system 500, various computer-readable media might be involved in providing instructions/code to processor(s) 510 for execution and/or might be used to store and/or carry such instructions/code (e.g., as signals). In many implementations, a computer-readable medium is a physical and/or tangible storage medium. Such a medium may take many forms, including but not limited to, non-volatile media, volatile media, and transmission media. Non-volatile media include, for example, optical and/or magnetic disks, such as the storage device(s) 525. Volatile media include, without limitation, dynamic memory, such as the working memory 535. Transmission media include, without limitation, coaxial cables, copper wire and fiber optics, including the wires that comprise the bus 505, as well as the various components of the communications subsystem 530 (and/or the media by which the communications subsystem 530 provides communication with other devices). Hence, transmission media can also take the form of waves (including without limitation radio, acoustic and/or light waves, such as those generated during radio-wave and infrared data communications).

In one or more examples, the functions described may be implemented in hardware, software, firmware, or any combination thereof. If implemented in software, the functions may be stored on or transmitted over as one or more instructions or code on a computer-readable medium. Computer-readable media may include computer data storage media. Data storage media may be any available media that can be accessed by one or more computers or one or more processors to retrieve instructions, code and/or data structures for implementation of the techniques described in this disclosure. "Data storage media" as used herein does not refer to transitory propagating signals. By way of example, and not limitation, such computer-readable media can comprise RAM, ROM, EEPROM, CD-ROM or other optical disk storage, magnetic disk storage, or other magnetic storage devices, flash memory, or any other medium that can be used to store desired program code in the form of instructions or data structures and that can be accessed by a computer. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above may also be included within the scope of computer-readable media.

The code may be executed by one or more processors, such as one or more digital signal processors (DSPs), general purpose microprocessors, application specific integrated circuits (ASICs), field programmable logic arrays (FPGAs), or other equivalent integrated or discrete logic circuitry. Accordingly, the term "processor," as used herein, may refer to any of the foregoing structure or any other structure suitable for implementation of the techniques described herein. In addition, in some aspects, the functionality described herein may be provided within dedicated hardware and/or software modules configured for encoding and decoding, or incorporated in a combined codec. Also, the techniques could be fully implemented in one or more circuits or logic elements.

The techniques of this disclosure may be implemented in a wide variety of devices or apparatuses, including a wireless handset, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a codec hardware unit or provided by a collection of interoperative hardware units, including one or more processors as described above, in conjunction with suitable software and/or firmware stored on computer-readable media.

Various examples have been described. These and other examples are within the scope of the following claims.

What is claimed is:

1. A method for providing location services to an application at a Secure User Plane Location (SUPL) Enabled Terminal (SET), the method comprising:
configuring, by a SUPL configuration server (SUPL CS), multiple SUPL location platforms (SLPs) in the SET in a first stage; and
configuring, by the SUPL CS, information independently in the SET for the application in a second stage, wherein configuration information for the application includes identification of a particular Home SLP (H-SLP) configured in the first stage.

2. The method of claim 1, wherein configuring in the first stage includes transmitting, to the SET, SLP information corresponding to the multiple SLPs, and wherein configuring in the second stage includes transmitting, to the SET, H-SLP information corresponding to the particular H-SLP.

3. The method of claim 2, wherein the SLP information includes addresses associated with the multiple SLPs, and wherein the H-SLP information includes an address associated with the particular H-SLP.

4. The method of claim 1, wherein the SUPL CS configures at least one H-SLP as part of the first stage.

5. The method of claim 1, wherein the SUPL CS configures at least one Discovered SLP (D-SLP) for at least one configured H-SLP as part of the first stage.

6. The method of claim 1, wherein the SUPL CS configures at least one Emergency SLP (E-SLP) for at least one configured H-SLP as part of the first stage.

7. The method of claim 1, wherein the application is permitted location access to only one configured H-SLP and any D-SLPs and E-SLPs authorized by or configured for the only one configured H-SLP.

8. The method of claim 7, wherein:
the application is not configured with an H-SLP as part of the second stage; and
the application is permitted location access to a default H-SLP configured in the first stage and any D-SLPs and E-SLPs authorized by or configured for the configured default H-SLP.

9. The method of claim 1, wherein the SUPL CS supports an authorization of the application as part of the second stage.

10. The method of claim 9, wherein information provided to the SET as part of the authorization can include a SUPL 2.0 application ID and an address of an H-SLP.

11. The method of claim 10, wherein the information provided to the SET further includes a time duration after which a re-authorization of the application is required.

12. The method of claim 9, wherein the application is authenticated by the SUPL CS as part of the authorization.

13. A secure user plane location configuration server (SUPL CS) for providing location services to an application at a Secure User Plane Location (SUPL) Enabled Terminal (SET) comprising:
one or more processors; and
memory storing computer-readable instructions that, when executed by the one or more processors, cause the SUPL CS to:
configure multiple SUPL location platforms (SLPs) in the SET in a first stage; and
configure information independently in the SET for the application in a second stage, wherein configuration information for the application includes identification of a particular Home SLP (H-SLP) configured in the first stage.

14. The SUPL CS of claim 13, wherein the instructions further cause the SUPL CS to:
in the first stage, transmit to the SET, SLP information corresponding to the multiple SLPs, and
in the second stage, transmit to the SET, H-SLP information corresponding to the particular H-SLP.

15. The SUPL CS of claim 14, wherein the SLP information includes addresses associated with the multiple SLPs, and wherein the H-SLP information includes an address associated with the particular H-SLP.

16. The SUPL CS of claim 13, further comprising instructions to configure at least one H-SLP as part of the first stage.

17. The SUPL CS of claim 13, further comprising instructions to configure at least one Discovered SLP (D-SLP) for at least one configured H-SLP as part of the first stage.

18. The SUPL CS of claim 13, further comprising instructions to configure at least one Emergency SLPs (E-SLP) for at least one configured H-SLP as part of the first stage.

19. The SUPL CS of claim 13, wherein the application is permitted location access to only one configured H-SLP and any D-SLPs and E-SLPs authorized by or configured for the only one configured H-SLP.

20. The SUPL CS of claim 19, wherein the application is not configured with an H-SLP as part of the second stage and is permitted location access to a default H-SLP configured as part of the first stage, and any D-SLPs and E-SLPs authorized by or configured for the configured default H-SLP.

21. The SUPL CS of claim 13, further comprising instructions to support an authorization of the application as part of the second stage.

22. The SUPL CS of claim 21, wherein information provided to a SUPL Enabled Terminal (SET) as part of the authorization can include a SUPL 2.0 application ID and an address of an H-SLP.

23. The SUPL CS of claim 22, wherein the information provided to the SET further includes a time duration after which a re-authorization of the application is required.

24. The SUPL CS of claim 21, wherein the application is authenticated by the SUPL CS as part of the authorization.

25. One or more non-transitory computer-readable media storing computer-executable instructions for providing location services to an application at a Secure User Plan Location (SUPL) Enabled Terminal (SET) that, when executed, cause one or more computing devices included in a SUPL configuration server (SUPL CS) to:
configure multiple SUPL location platforms (SLPs) in the SET in a first stage; and configure information independently for the application in the SET in a second stage, wherein configuration information for the application includes identification of a particular Home SLP (H-SLP) configured in the first stage.

26. The one or more non-transitory computer-readable media of claim 25, wherein the instructions further cause the one or more computing devices to:
in the first stage, transmit to the SET, SLP information corresponding to the multiple SLPs, and
in the second stage, transmit to the SET, H-SLP information corresponding to the particular H-SLP.

27. The one or more non-transitory computer-readable media of claim 26, wherein the SLP information includes addresses associated with the multiple SLPs, and wherein the H-SLP information includes an address associated with the particular H-SLP.

28. An apparatus for providing location services to an application at a Secure User Plan Location (SUPL) Enabled Terminal (SET) comprising:
means for configuring multiple SUPL location platforms (SLPs) in the SET in a first stage; and
means for configuring information in the SET independently for the application in a second stage, wherein configuration information for the application includes identification of a particular Home SLP (H-SLP) configured in the first stage.

29. The apparatus of claim 28, wherein the means for configuring in the first stage includes a means for transmitting SLP information corresponding to the multiple SLPs, and wherein the means for configuring in the second stage includes a means for transmitting H-SLP information corresponding to the particular H-SLP.

30. The apparatus of claim 29, wherein the SLP information includes addresses associated with the multiple SLPs, and wherein the H-SLP information includes an address associated with the particular H-SLP.

31. A method of a Secure User Plane Location (SUPL) Enabled Terminal (SET) to obtain location services for an application associated with the SET, the method comprising:
receiving a location services request;
determining whether the application is associated with a home SUPL location platform (H-SLP); and
if it is determined that the application is associated with the H-SLP, obtaining location services based on the location services request, using the H-SLP or using an SLP from one or more SLPs associated with the H-SLP.

32. The method of claim 31, further comprising:
if it is determined that the application is not associated with the H-SLP:
determining if the application is allowed access to a default H-SLP.

33. The method of claim 32, further comprising:
if it is determined that the application is allowed access to the default H-SLP: obtaining location services based on the location services request using the default H-SLP.

34. The method of claim 32 further comprising:
if it is determined that the application is not allowed to use the default H-SLP: rejecting the location services request.

35. The method of claim 31 further comprising:
determining whether the location services request is a first request from the application;
if it is determined that the location services request is the first request from the application:
transmitting a service request to a SUPL Configuration Server (CS), wherein the service request includes information associated with the application;
receiving an address of the H-SLP from the SUPL CS, if it is determined by the SUPL CS that the application is associated with an H-SLP; and
storing the received address of the H-SLP associated with the application.

36. The method of claim 35, further comprising:
receiving a time duration associated with the address of the H-SLP.

37. The method of claim 31, wherein the one or more SLPs associated with the H-SLP comprises one or more discovered SUPL location platforms (D-SLPs) and/or one or more emergency SUPL location platforms (E-SLPs) authorized by the H-SLP to respond to the location services request from the application.

38. The method of claim 31, wherein the one or more SLPs associated with the H-SLP comprises one or more D-SLPs and/or one or more E-SLPs configured by a SUPL CS to respond to the location services request from the application.

39. A Secure User Plane Location (SUPL) Enabled Terminal (SET) for obtaining location services for an application associated with the SET, the SET comprising:
one or more processors configured to:
receive a location services request;
determine whether the application is associated with an H-SLP; and
if it is determined that the application is associated with the H-SLP, obtain location services based on the location services request, using the H-SLP or using an SLP from one or more SLPs associated with the H-SLP.

40. The SET of claim 39, wherein the one or more processors is further configured to:
if it is determined that the application is not associated with the H-SLP:
determine if the application is allowed access to a default H-SLP.

41. The SET of claim 40, wherein the one or more processors is further configured to:
if it is determined that the application is allowed access to the default H-SLP: obtain the location services based on the location services request using the default H-SLP.

42. The SET of claim 40, wherein the one or more processors is further configured to:
if it is determined that the application is not allowed to use the default H-SLP: reject the location services request.

43. The SET of claim 39, wherein the one or more processors is further configured to:
determine whether the location services request is a first request from the application;
if it is determined that the location services request is the first request from the application:
transmit a service request to a SUPL Configuration Server (CS), wherein the service request includes information associated with the application;
receive an address of the H-SLP from the SUPL CS, if it is determined by the SUPL CS that the application is associated with an H-SLP; and
store the received address of the H-SLP associated with the application.

44. The SET of claim 43, wherein the one or more processors is further configured to:
receive a time duration associated with the address of the H-SLP.

45. The SET of claim 39, wherein the one or more SLPs associated with the H-SLP comprises one or more discovered SUPL location platforms (D-SLPs) and/or one or more emergency SUPL location platforms (E-SLPs) authorized by the H-SLP to respond to the location services request from the application.

46. The SET of claim 39, wherein the one or more SLPs associated with the H-SLP comprises one or more D-SLPs and/or one or more E-SLPs configured by a SUPL CS to respond to the location services request from the application.

47. One or more non-transitory computer-readable media storing computer-executable instructions for obtaining location services for an application that, when executed, cause one or more computing devices to:
- receive a location services request;
- determine whether the application is associated with an H-SLP; and
- if it is determined that the application is associated with the H-SLP, obtain location services based on the location services request, using the H-SLP or using an SLP from one or more SLPs associated with the H-SLP.

48. An apparatus for obtaining location services for an application comprising:
- means for receiving a location services request;
- means for determining whether the application is associated with a home SUPL location platform (H-SLP); and
- if it is determined that the application is associated with the H-SLP, means for obtaining location services based on the location services request, using the H-SLP or using an SLP from one or more SLPs associated with the H-SLP.

* * * * *